US009361698B1

(12) United States Patent
Song et al.

(10) Patent No.: US 9,361,698 B1
(45) Date of Patent: Jun. 7, 2016

(54) STRUCTURE LIGHT DEPTH SENSOR

(71) Applicant: Amazon Technologies, Inc., Seattle, WA (US)

(72) Inventors: Ji liang Song, Cupertino, CA (US); Qiang Liu, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 14/539,238

(22) Filed: Nov. 12, 2014

(51) Int. Cl.
*G06T 7/00* (2006.01)

(52) U.S. Cl.
CPC ............. *G06T 7/0065* (2013.01); *G06T 7/0026* (2013.01); *G06T 7/0057* (2013.01); *G06T 2207/10028* (2013.01); *G06T 2207/20148* (2013.01)

(58) Field of Classification Search
None
See application file for complete search history.

(56) References Cited

U.S. PATENT DOCUMENTS

| 7,747,067 B2 * | 6/2010 | Popescu .................. G01B 11/25 382/154 |
| 2005/0280831 A1 * | 12/2005 | Fujiwara ............ G01B 11/2536 356/603 |
| 2007/0124949 A1 * | 6/2007 | Burns ................. G01B 11/2509 33/288 |
| 2009/0074287 A1 * | 3/2009 | Kawashima ............ G03F 1/144 382/144 |
| 2013/0002859 A1 * | 1/2013 | Yamaguchi ............. G01S 17/48 348/135 |
| 2013/0075896 A1 * | 3/2013 | Yoda ................... H01L 21/6835 257/737 |
| 2014/0078490 A1 * | 3/2014 | Higo ...................... G01B 11/25 356/4.01 |
| 2015/0229907 A1 * | 8/2015 | Bridges ................ G01B 21/047 348/46 |

OTHER PUBLICATIONS

Batlle, Recent Progress in Coded Structured Light As a Technique to Solve the Correspondence Problem: A Survey, Pattern Recognition, No. 7, pp. 963-982, 1998.

* cited by examiner

*Primary Examiner* — Wesley Tucker
(74) *Attorney, Agent, or Firm* — Seyfarth Shaw LLP; Ilan N. Barzilay; Cyrus A. Miller

(57) ABSTRACT

A system and method for determining depth information of an object is provided. The system projects dots on an object and captures an image of the object with captured dots. The system identifies the captured dots based on a brightness of the captured dots and identifies coordinates of the captured dots. The system processes the captured image by removing brightness information of pixels outside of the captured dots. The system processes the captured dot by overlaying synthesized dot image on the captured dot. The system divides the processed captured image into captured sections and compares the captured sections to reference sections. The system selects individual reference sections having a highest correlation score for each of the captured sections and correlates a captured dot from each of the captured sections to a reference dot in respective corresponding reference sections. Depth information may be calculated based on coordinates of the captured dots and correlated reference dots.

20 Claims, 15 Drawing Sheets

DOT MAPPING

```
0 0 0 0 0 0 1 0 0
0 0 0 0 0 0 0 0 0
0 1 0 1 0 1 0 1 0
0 0 0 0 0 0 0 0 0
0 1 0 0 1 0 1 0 0
0 0 0 0 0 0 0 0 1
0 0 1 0 1 0 1 0 0
1 0 0 0 0 0 0 0 1
0 0 0 0 0 0 0 0 0
```

BINARY PATCH

POTENTIAL MATCH

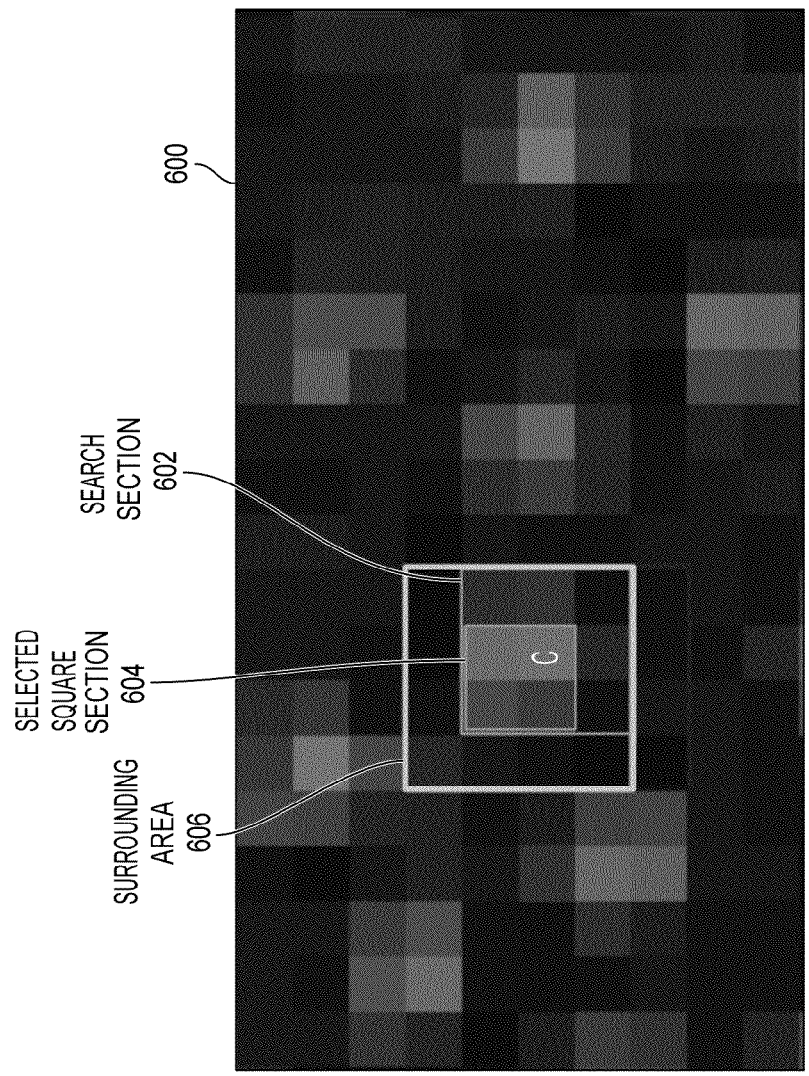

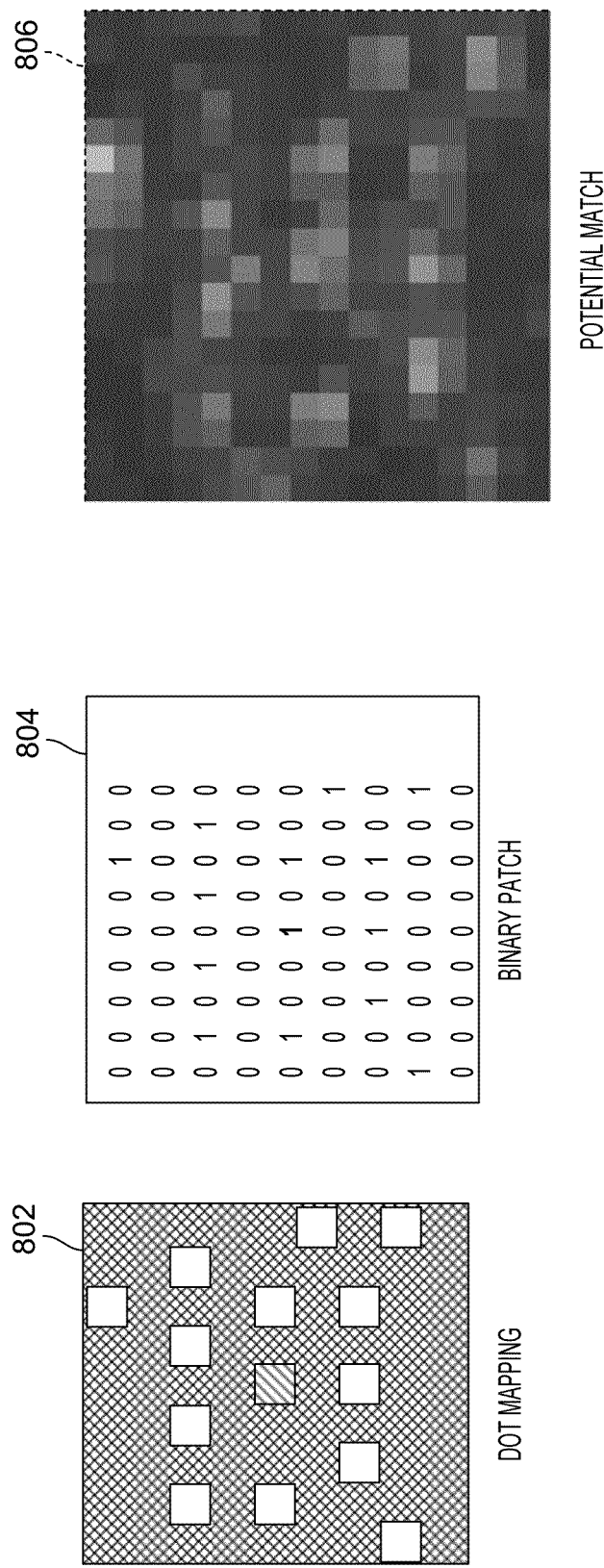

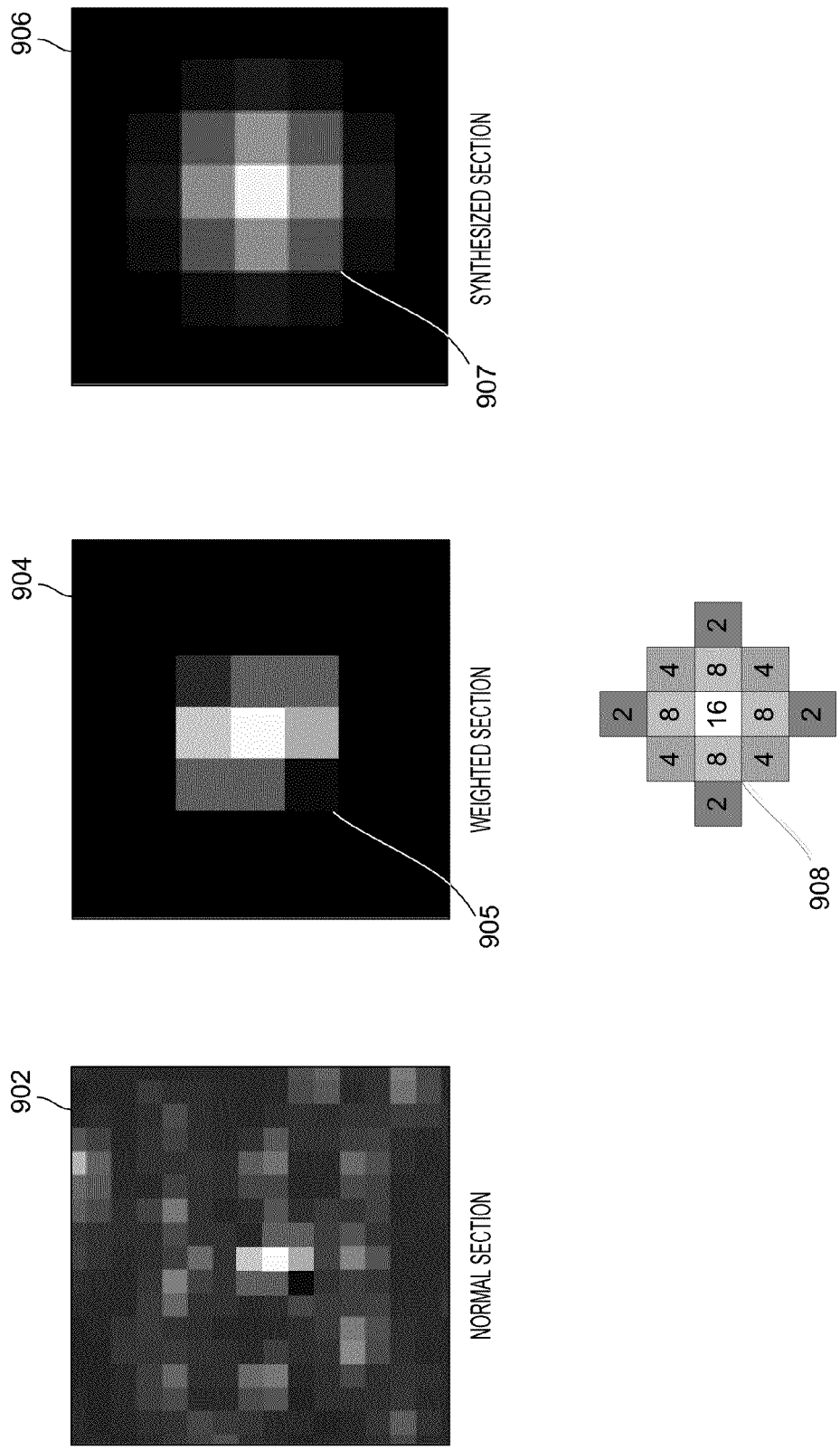

STRUCTURE LIGHT DEPTH SENSOR

BACKGROUND

Electronic devices may measure a depth and/or determine a three-dimensional shape of one or more objects using projected light patterns and a camera system.

BRIEF DESCRIPTION OF DRAWINGS

For a more complete understanding of the present disclosure, reference is now made to the following description taken in conjunction with the accompanying drawings.

FIG. 6A illustrates an example of identifying a dot and a region surrounding the dot.

FIG. 8A illustrates an example of a method for setting a search region for a dot.

FIG. 9A illustrates examples of processing an image to create a patch.

DETAILED DESCRIPTION

Figure 1:
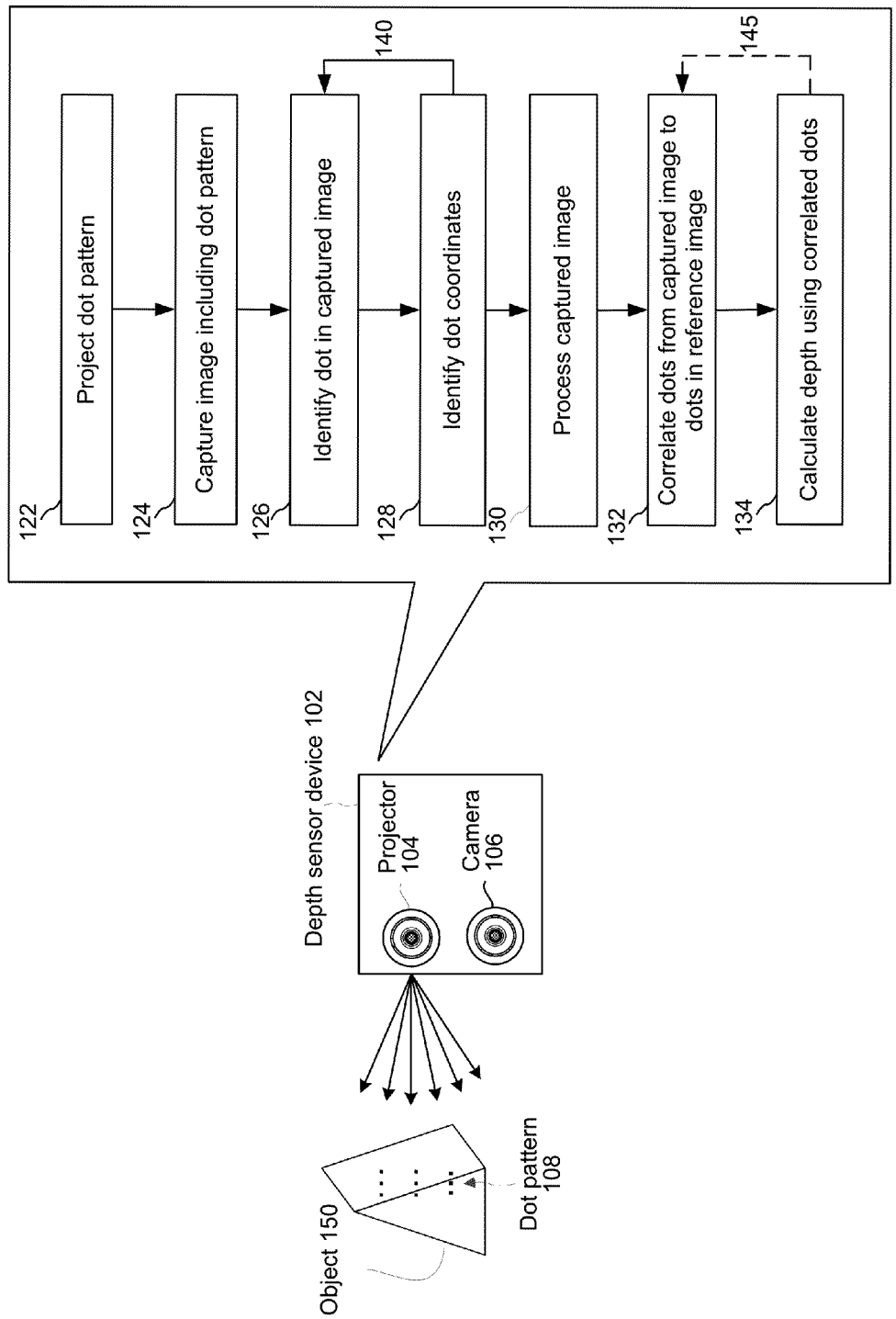
FIG. 1 illustrates a depth sensor device and corresponding method for determining a three-dimensional shape of an object.

Structured light is the process of projecting a known pattern of projected dots on to a scene including objects. The way that the projected dots change when striking surfaces in the scene allows vision systems to calculate depth and surface information of the objects in the scene based on the geometric distortion of the projected dots. The depth and surface information may be used to generate a geometric reconstruction of the surface shape or may simply provide depth information for the image. To determine the geometric distortion, the vision system may match/correlate individual specific dots from the projected dots with the corresponding individual specific dots seen in a captured image. Based on the number of dots projected (projected dots), there are potentially hundreds or thousands of projected dots to correlate with hundreds or thousands of dots in the captured image (captured dots). As can be appreciated, matching an individual captured dot with its corresponding projected dot is a non-trivial problem.

In order to effectively correlate captured dots in a captured image to projected dots, a depth sensor device may use a new method for identifying dots and correlating the captured dots with the projected dots. Although explained in detail below, one embodiment of the new method may be described generally as follows. First, to calibrate the device, the device may project the dots onto a flat surface at a fixed distance to create a reference image of the flat surface with the projected dots. Then, during runtime the device will capture the captured image of the dots projected onto the three-dimensional object. As the captured dots are located at different distances from the device and may be distorted, the captured dots are not uniform and the size and brightness of the captured dots may vary. The device may thus filter out bright spots that do not correspond to the captured dots (such as brightness caused by noise, blur, or other factors). Using the captured image, the device may identify individual captured dots by isolating the brightest spots in the captured image by identifying a local brightest point, determining a selected area around the brightest point and determining the coordinates of the brightness center of the selected area. The coordinates of the captured dots (which may be at a sub-pixel precision, as described below) establish the location of the captured dots.

After locating the captured dots, the device may process sections of the captured image (where the sections may be centered on individual captured dots) to make the sections easier to correlate to the reference image. The section boundaries and sizes may not be uniform across the captured image. The processing may "clean" the sections to make the dot in the section more identifiable from the remainder of the pixels in the section. To do that, the device may weight the pixels in the section by retaining the pixels of the captured dots and setting all remaining pixels in the section to a fixed brightness. The fixed brightness may be zero, effectively blacking out pixels that are not part of the captured dots. The device may then use a blur function to evenly spread the brightness centers of the captured dots to neighboring pixels, thus slightly expanding the brightness of the dot and making it easier to match with dots in the reference image when performing correlation. The device may use a similar method to identify reference dots in the reference image and generate processed sections centered on individual reference dots. The device may then correlate the captured dots to the reference dots by calculating correlation scores between a captured section and different reference sections. The reference section that has the highest correlation score to a captured section may be selected as a match to the particular captured section. The individual dots may then be correlated based on the correlated sections, and the shape of the object determined by matching the individual dots and performing depth calculations, as explained below.

FIG. 1 illustrates a depth sensor device 102 and corresponding method for determining a three-dimensional shape of an object 150, for the portion of the object facing the device 102. The device 102 may include and/or be communicatively coupled to a projector 104 and a camera 106. To measure a depth of and/or determine a three-dimensional shape of one or more objects, such as object 150, in a scene, the device 102 may project (122) a dot pattern 108 onto the scene using the projector 104 and may capture (124) an image including the dot pattern 108 using the camera 106. The device 102 may identify (126) a dot in the captured image. The dot may be identified using a location of maximum intensity in a region of the captured image. The intensity may be an intensity of any metric, such as brightness, luminance, radiation, etc. For ease of description, "intensity" may be used to refer to a brightness intensity or brightness metric, although the disclosure is not limited thereto and any metric may be used. The device 102 may identify (128) coordinates of the dot in the captured image based on the dot's location of maximum intensity (i.e., the dot's brightest part). The device 102 may loop (140) between step 128 and 126 to identify a plurality of dots in the captured image and corresponding dot coordinates. The device 102 may process (130) the captured image to make the dots more identifiable from the remainder of pixels in the captured image. The device 102 may correlate (132) dots from the captured image to dots in the reference image. The device may calculate (134) depth information using the correlated dots. Optionally, the device 102 may loop (145) between step 134 and 132 and use the calculated depth information in correlating the dots from the captured image to the dots in the reference image. The abovementioned steps will be described in greater detail below with regard to corresponding figures.

The device 102 may calculate depth information using any method known to one of skill in the art. Examples of some techniques used to calculate depth information are described in greater detail in Batlle, J., Mouaddib, E. and Salvi, J. "Recent Progress In Coded Structured Light As A Technique To Solve The Correspondence Problem: A Survey," Pattern Recognition, Vol. 31, No. 7 (1998): 963-982, which is incorporated by reference in its entirety.

Figure 2:
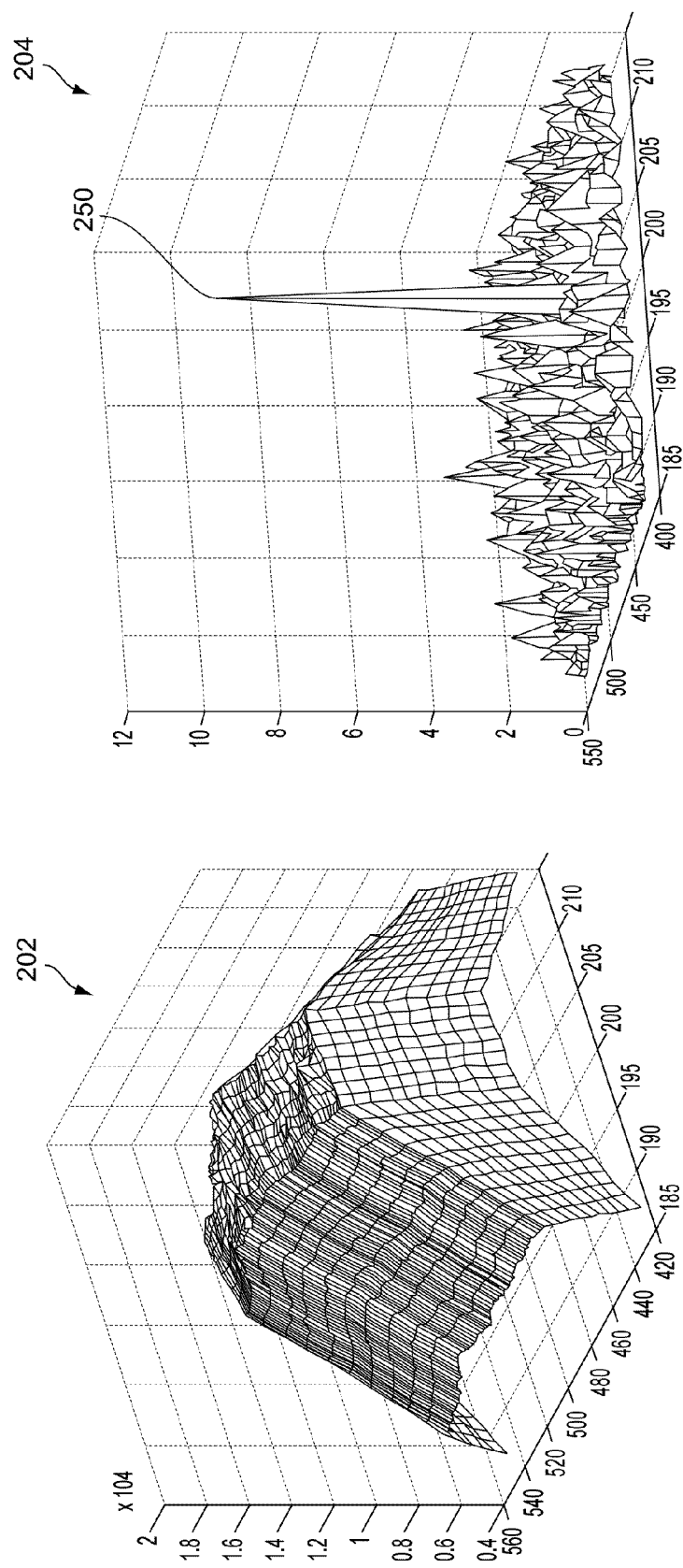
FIG. 2 illustrates a first example correlation chart based on correlating unprocessed images and a second example correlation chart based on correlating images processed according to some example embodiments.

As discussed above and described in greater detail below, the device 102 may project a pattern of dots onto a scene and acquire a captured image of the scene including the dots. The device may compare individual captured regions from the captured image to reference regions of reference image(s) to determine a correlation between a single captured region and a single reference region. FIG. 2 illustrates a first example correlation chart 202 based on correlating unprocessed images and a second example correlation chart 204 based on correlating images processed according to some example embodiments. Note that increasing or decreasing a search region associated with a captured region will increase or decrease the size of the correlation charts illustrated in FIG. 2.

The first example correlation chart 202 is based on a captured region of the captured image and reference regions of reference image(s) when the captured image and the reference image(s) are not processed. Instead, the captured image and the reference image(s) include the dots and additional information based on the scene. As shown in the first example correlation chart 202, there are a number of reference regions that potentially correspond to the captured region. Therefore, the first example correlation chart 202 illustrates that due to noise included because the captured image and the reference image(s) are not processed, it is difficult to identify a particular reference region corresponding to the captured region.

In contrast, the second example correlation chart 204 is based on a captured region of a captured image and reference regions of reference image(s) when the captured image and the reference image(s) are processed according to some example embodiments. As will be described in greater detail below with regard to FIGS. 6A-7B, the device 102 may identify individual dots in the captured image and the reference image(s) and may identify exact coordinates and sizes for the dots. For example, the device 102 may identify first pixels associated with the dots (along with coordinates for brightness centers of the dots) and second pixels not associated with the dots. As will be described in greater detail below with regard to FIGS. 9A-9C, the device 102 may process the captured image and the reference image(s) to remove noise and/or additional information not related to the dots. For example, the device 102 may remove all intensity information from the second pixels, blanking the captured image and the reference image(s) to black except for the dots. In addition, the device 102 may generate synthesized dot images and superimpose the synthesized dot images on the first pixels based on the coordinates for the brightness centers of the dots. For example, a first dot may be a first size and centered on a first coordinate, so a corresponding first synthesized dot image may be generated based on the first size and may be inserted on the first coordinate. In contrast to an uneven distribution of intensities of pixels within the first dot, intensities of pixels included in the first synthesized dot image may be evenly distributed as a bell shaped curve. Therefore, the processed captured image and processed reference image(s) may be stripped of intensity information aside from evenly distributed pixels centered on the dots.

As a result of processing the captured image and/or the reference image(s), the second example correlation chart 204 has a single reference region having a high correlation score for the captured region, shown by peak 250. Therefore, the device 102 may match the single reference region to the captured region with a reduced margin of error relative to the first example correlation chart 202. The device 102 may generate a correlation chart similar to the second example correlation chart 204 for individual captured regions, identifying individual reference regions correlating to the individual captured regions. Based on the captured regions and corresponding matching reference regions, the device 102 may correlate dots in the captured image to dots in the reference image.

Figure 3:
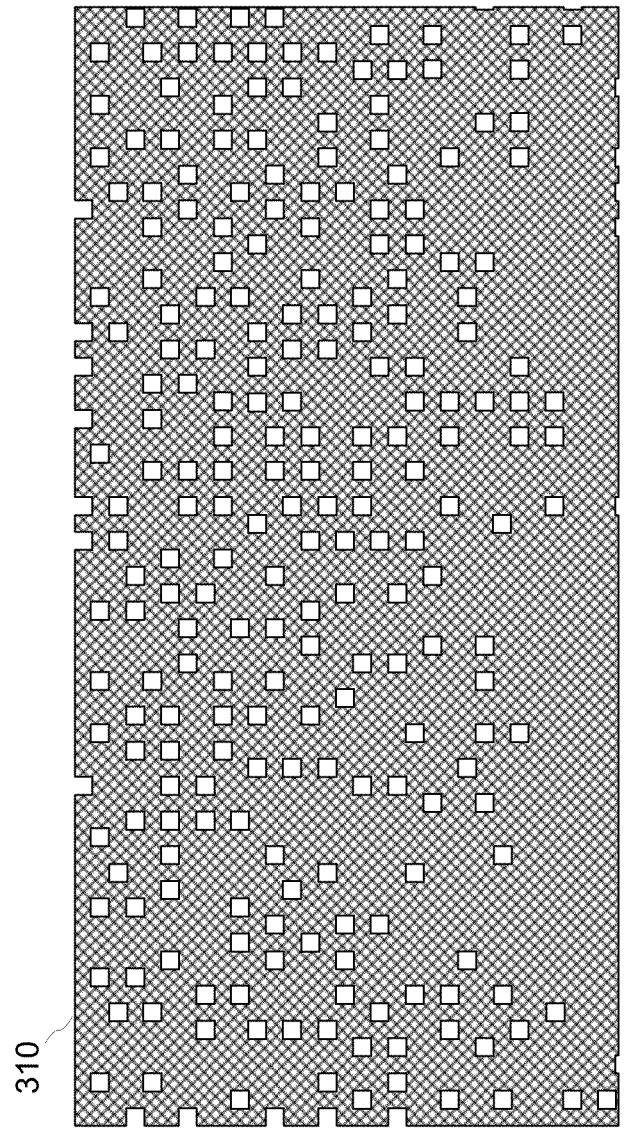
FIG. 3 illustrates an example of a pseudo-random dot pattern.

FIG. 3 illustrates an example of a pseudo-random dot pattern. The projector 104 of device 102 may project a pseudo-random dot pattern similar to the example illustrated in FIG. 3, although the disclosure is not limited thereto. For example, the device 102 may project any dot pattern known to one of skill in the art without departing from the disclosure, including temporal coded dot patterns, spatial coded dot patterns, etc. In addition, the device 102 may project different dot patterns at different times. As a first example, the device 102 may project a temporal coded dot pattern in a first situation, a spatial coded dot pattern in a second situation, and a pseudo-random dot pattern in a third situation. As a second example, the device 102 may project a first pseudo-random dot pattern in a first situation, a second pseudo-random dot pattern in a second situation, and a third pseudo-random dot pattern in a third situation. If different dot patterns are used, different reference images for the respective dot patterns may also be created and used as described below.

Additionally, the device 102 may project multiple dot patterns to improve an accuracy of the device 102. For example, the device 102 may store a first pseudo-random dot pattern, a second pseudo-random dot pattern and a third pseudo-random dot pattern and one or more reference images generated during calibration that are associated with the first, second and third dot patterns. Without moving, the device 102 may project the first, second and third dot patterns on object(s) in a scene and capture images for each of the first, second and third dot patterns. In this example, the device 102 may repeat the method illustrated in FIG. 1 for each of the first, second and third dot patterns to generate first, second and third depth information based on the corresponding one or more reference images. As the device 102 did not move between the first, second and third dot patterns, locations of the object(s) in the scene should be identical between the captured images. Therefore, the device 102 may select one of the first, second and third depth information as final depth information for the scene. Alternatively, the device 102 may combine the first, second and/or third depth information into combined final depth information, using the first, second and/or third dot patterns as additional data points to increase a resolution of the final depth information. As another alternative, the device 102 may determine final depth information based on a comparison of the first, second and third depth information. In this example, the device 102 may correct for distortion or otherwise modify the final depth information based on potential inconsistencies between the first, second and third depth information.

For ease of explanation, the disclosure refers to "dots," but the disclosure is not limited thereto. Instead, the device 102 may project "forms" or "geometric shapes" without departing from the present disclosure. Geometric shapes may include dots, points, lines, planes, circles, arcs, polygons such as triangles, squares and rectangles and/or any other geometric shape. In addition, the device 102 may project multiple different types of geometric shapes without departing from the present disclosure. The description and/or method for locating a brightness center of a dot may be modified according to the geometric shape being projected by the device 102 without departing from the present disclosure.

Figure 4:
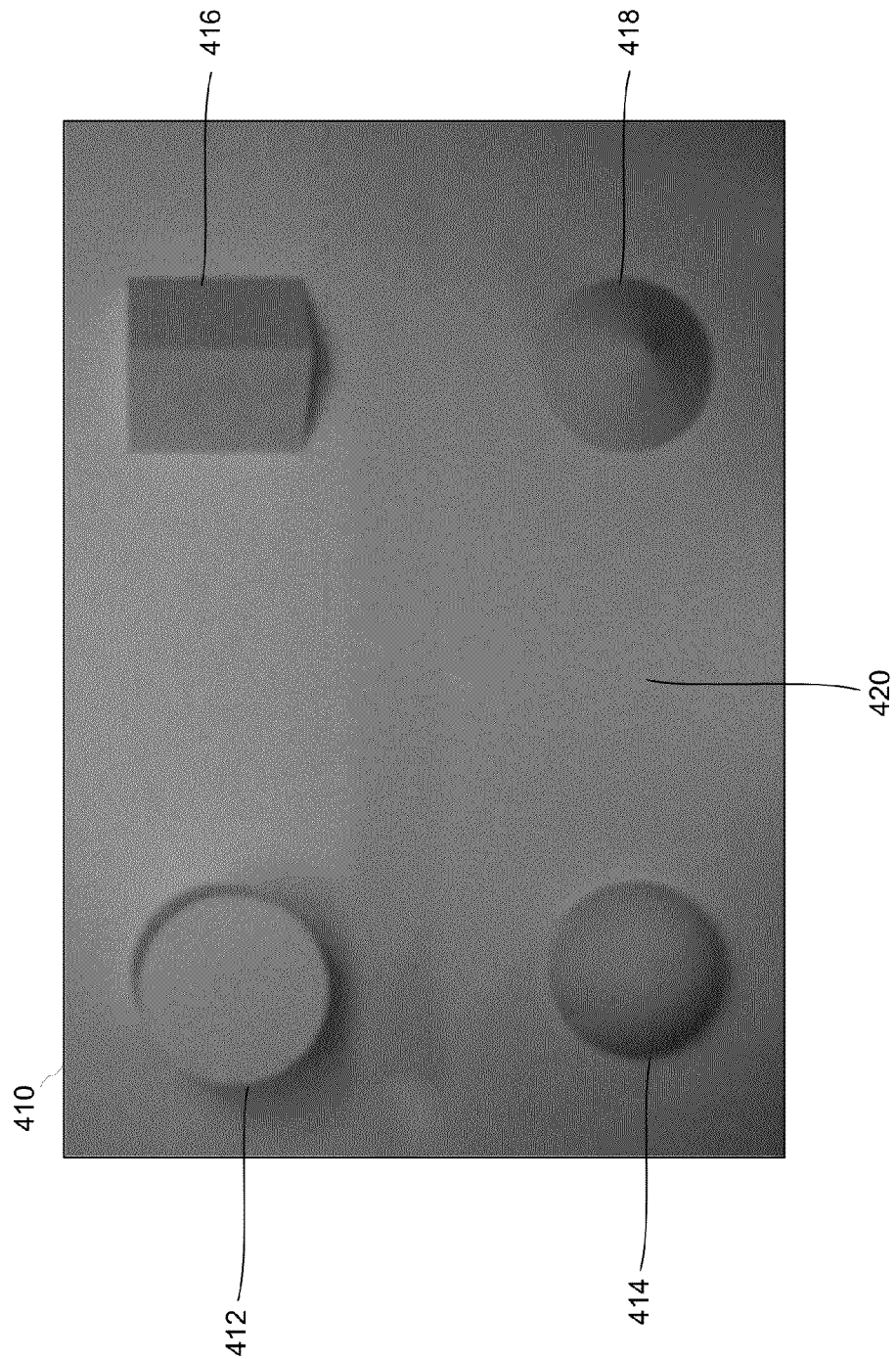
FIG. 4 illustrates an example of three-dimensional objects.

FIG. 4 illustrates an example of three-dimensional objects in a scene 410. As illustrated in FIG. 4, the scene 410 may include a first object 412, a second object 414, a third object 416, a fourth object 418 and a background 420.

Figure 5A:
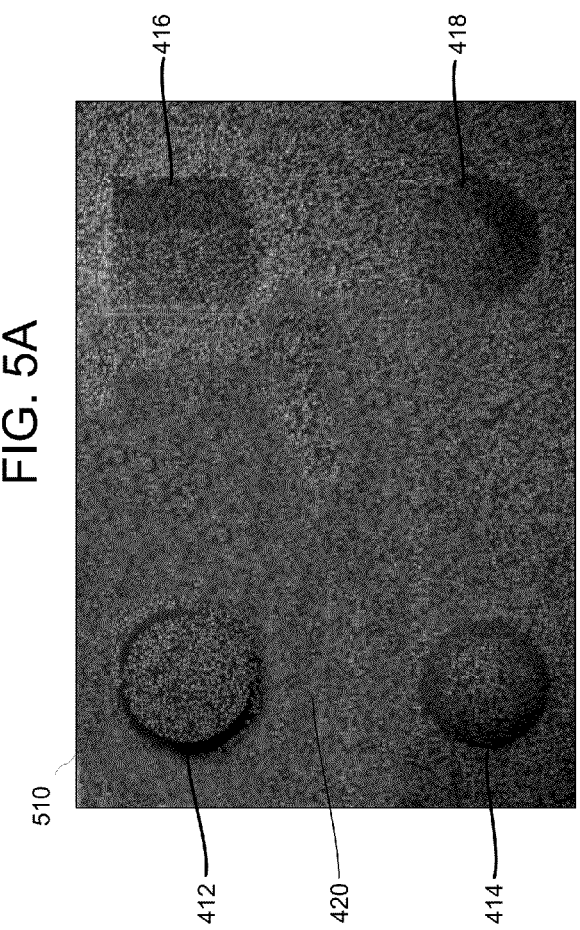
FIG. 5A illustrates a pseudo-random dot pattern projected on a scene including three-dimensional objects.
Figure 5B:
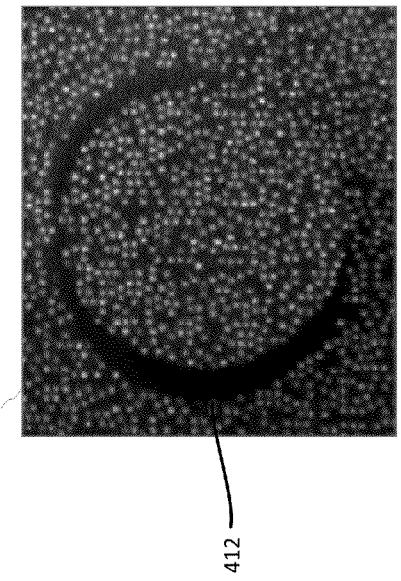
FIG. 5B illustrates a close-up of the pseudo-random dot pattern projected on one of the three-dimensional objects illustrated in FIG. 5A.

FIG. 5A illustrates an example of a captured image showing a pseudo-random dot pattern projected on a scene 510 including the three-dimensional objects illustrated in FIG. 4. For example, FIG. 5A illustrates the pseudo-random dot pattern projected onto the first object 412, the second object 414, the third object 416, the fourth object 418 and the background 420 from FIG. 4. FIG. 5B illustrates a magnified view 530 of the pseudo-random dot pattern projected onto the first object 412 from FIG. 5A. The scene 510 may include one or more objects at various distances from the device 102. For object scanning, the scene 510 may include a limited number of objects in the foreground of the scene. For three-dimensional imaging, the scene 510 may include any number of objects in the foreground and/or the background at various distances. A resolution of depth information may be based on a number of dots projected by the projector 104, such that a higher number of projected dots results in a greater amount of depth information, and potentially more precision in the depth calculations. Similarly, an amount of depth information for a particular object may vary based on a distance between the projector 104 and the particular object, as the projector 104 may project a greater number of dots onto the particular object at closer distances.

As illustrated in FIG. 5A, the dot pattern increases an intensity in localized areas on the objects and/or the scene, the localized areas corresponding to the dots in the dot pattern. Coordinates and/or relative positions of the dots in the captured image may be different than coordinates and/or relative positions of the dots in the projected dot pattern. Based on these differences, the device 102 may determine the depth information. As discussed above, the device 102 may store one or more reference images for each projected dot pattern. Thus, rather than comparing coordinates of the dots in the captured image to the coordinates of the dots in the projected dot pattern, the device 102 may compare the coordinates of the dots in the captured image to coordinates of the dots in the one or more reference images.

FIG. 6A illustrates an example of identifying a dot. For ease of explanation, the following description may refer to individual pixels, but the disclosure is not limited thereto and the device 102 may group pixels without departing from the disclosure. As illustrated in FIG. 6A, a portion 600 of a captured image may include several dots having an increased intensity relative to an average intensity of the portion 600. The intensity may be an intensity of any metric, such as brightness, luminance, radiation, etc. For ease of description, "intensity" may be used to refer to a brightness intensity, although the disclosure is not limited thereto and any metric may be used. The device 102 may identify a dot in the captured image using a location of the maximum intensity of the dot. For example, the device 102 may select the local maximum based on an intensity and may select a section of the captured image around the local maximum, where the section has a maximum average intensity. That section may then be considered as the dot. FIG. 6A includes examples of a local maximum c, a search section 602, a selected square section 604 and surrounding area 606.

A local maximum c may be an individual pixel having a highest intensity in a local region. The device 102 may determine a size and location of a dot including the local maximum c. In some example embodiments, the device 102 may assume a fixed size for a dot, such as a 2 pixel by 2 pixel square, a 3 pixel by 3 pixel square or any other sized square. In these examples, the number of potential squares (length y) that include the local maximum c can be calculated as $y^2$. Thus, a size of the search section 602 may be based on the assumed fixed size of the dot. For example, if the fixed size of the dot is a 2×2 square, there are four potential 2×2 squares that include the local maximum c, resulting in the search section 602 being a 3×3 square. Similarly, if the fixed size of the dot is a 3×3 square, there are nine potential 3×3 squares that include the local maximum c, resulting in a corresponding search section being a 5×5 square. Thus, a length of the search section may be calculated as 2y−1. In some example embodiments, the device 102 may adaptively determine a size for dot(s) based on an intensity of pixels surrounding the local maximum c. For example, the device 102 may determine that a first dot is best represented by a 2×2 square and that a second dot is best represented by a 3×3 square. The size of the desired representation of the dot may be based on a distance of the dot and thus adaptively determining the best representation of the dot may provide more detailed coordinates for the dot relative to using a fixed size. In some example embodiments, the device 102 may determine that a best representation of the dot is a rectangle instead of a square. For example, for a rectangle that is x pixels by y pixels, a corresponding search region may be 2x−1 pixels by 2y−1 pixels and may include x*y potential rectangles that include the local maximum c. In these examples, the local maximum c may be used to bisect a selected rectangle in a vertical direction and a horizontal direction and similar methods as those described below may be used to determine coordinates of the dot using an intensity of pixels in the selected rectangle.

Figure 6B:
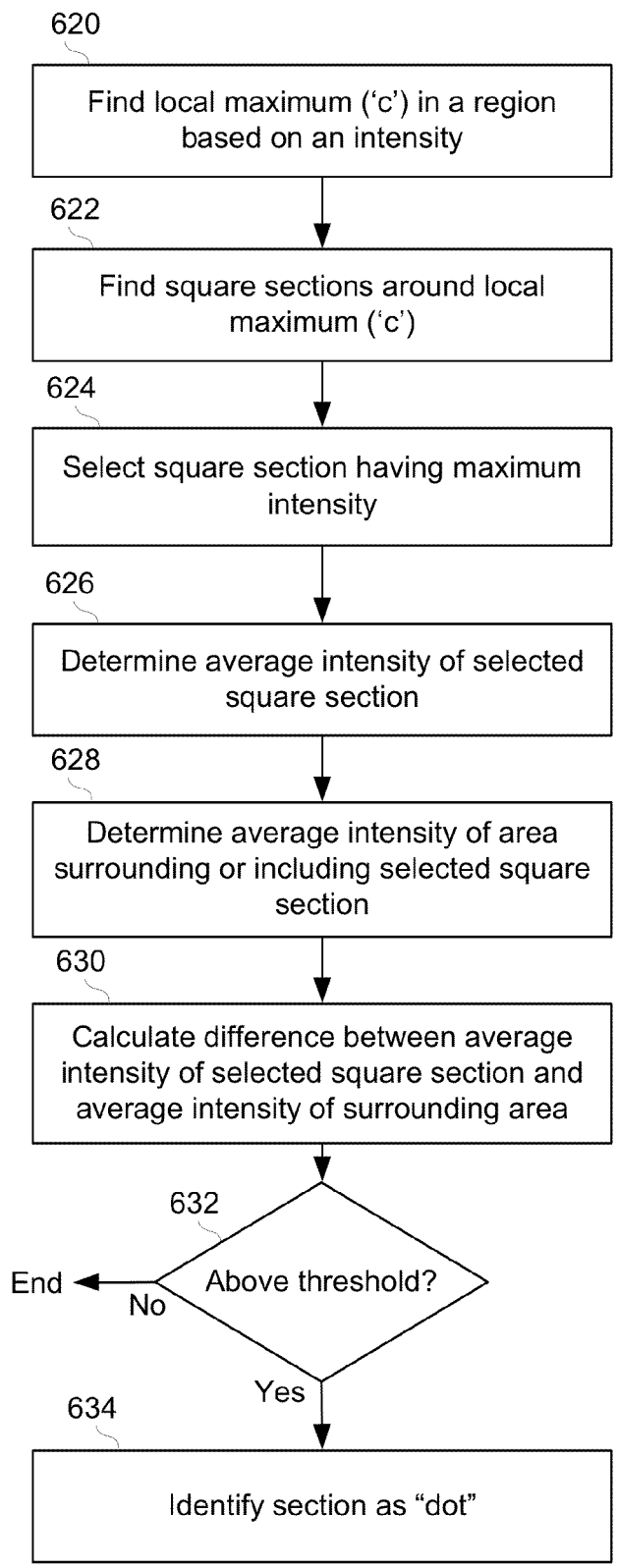
FIG. 6B illustrates a flowchart of a method for identifying a dot.

FIG. 6B illustrates a flowchart of a method for identifying the dot illustrated in FIG. 6A. The device 102 may find (620) a local maximum c in portion 600 based on an intensity. For example, the device 102 may identify a pixel (labeled c in FIG. 6A) as having a highest intensity in a local region and may identify this pixel as the local maximum c.

The device 102 may find (622) square sections around the local maximum c. As discussed above, a size of the square sections may be fixed or variable and a number of square sections including the local maximum c may be based on the size of the square section. For example, for square sections having a length y, the device 102 may find $y^2$ potential square sections in a search region having a length of 2y−1. Thus, if the size of the square section is fixed as having a length of 2, the device 102 may determine that the search section 602 has a length of 3 (2*2−1=3) and includes four potential 2×2 square sections, such as the selected square section 604. Similarly, if the size of the square section is fixed as having a length of 3, the device 102 may determine that the search region has a length of 5 (2*3−1=5) and includes nine potential 3×3 square sections.

The device 102 may select (624) a square section having a maximum intensity of the potential square sections included in the search section 602. For example, the device 102 may sum an intensity of pixels in each of the potential square sections and select a square section having the highest sum as the selected square section 604. Alternatively, the device 102 may select a square section using any methods known to one of skill in the art.

The device 102 may determine (626) an average intensity of the selected square section 604. The device 102 may determine (628) an average intensity of an area surrounding or including the selected square section 604. For example, the device 102 may determine an average intensity of the surrounding area 606 excluding the selected square section 604. As an alternative, the device 102 may determine an average intensity of the surrounding area 606 including the selected square section 604.

The device 102 may calculate (630) a difference between the average intensity of the selected square section 604 calculated in 626 and the average intensity of the surrounding area 606 calculated in step 628. The device 102 may determine (632) if the difference is above a threshold. If the difference isn't above the threshold, the device 102 does not identify the selected square section 604 as a dot and may begin the method using a different local maximum c. If the difference is above the threshold, the device 102 may identify the selected square section 604 as a dot. Thus the threshold may be configured to separate sections that show a bright dot more distinctly than other sections from generally bright sections.

A dot in the captured image that corresponds to a dot in the reference image may be referred to as a true positive. Non-dot areas in the captured image that correspond to non-dot areas in the reference image may be referred to as true negatives. Errors occur when the device 102 fails to identify a dot in the captured image corresponding to a dot in the reference image (a false negative) and when the device 102 identifies a dot in the captured image that does not correspond to a dot in the reference image (a false positive). These errors may reduce an accuracy of the device 102 and increase a difficulty of correlating dots between the captured image and the reference image. To reduce a number of false positive dots, the device 102 may increase the threshold used in step 632. However, such an increase in the threshold may increase a number of false negative dots. Therefore, the device 102 may decrease the threshold used in step 632 to include any potential dots (reducing false negative errors) and then filter out certain dots to reduce false positive errors.

The device 102 may filter out potential false positive dots using one or more embodiments. In addition to the embodiments of filtering false positive dots discussed below, the device 102 may apply a blur filter, explained in greater detail below with regard to FIG. 9C, to the captured image and/or the reference image prior to steps 620, 622, 624, 626, 628 and 630. While this technique does not filter out false positive dots after being mistakenly identified, this technique may be used to reduce a likelihood of the device 102 identifying false positive dots.

As an example of a first embodiment for removing false positive dots, the device 102 may determine if two or more identified dots are located in close proximity to each other and determine if any of the two or more identified dots should be removed. For example, the device 102 may determine a distance between a first identified dot to a second and/or third identified dot(s) and determine if the distance(s) exceeds a threshold. If the distance(s) do not exceed the threshold, the device 102 may compare the first identified dot and the second and/or third identified dot(s) within the distance threshold and determine if one or more of the identified dots should be removed. For example, the device 102 may select an identified dot having a highest difference calculated in step 630 and remove remaining identified dot(s) within the distance threshold to the selected identified dot. Alternatively, the device 102 may determine if an identified dot is in close proximity to multiple other identified dots. For example, if the first identified dot is in close proximity to the second and third identified dots, but the second and third identified dots are not in close proximity to other identified dots, the device 102 may remove the first identified dot regardless of the difference calculated in step 630.

As an example of a second embodiment for removing false positive dots, the device 102 may compare a first identified dot to neighboring identified dots and remove the first identified dot if the first identified dot has a lower difference calculated in step 630 relative to the neighboring identified dots. Thus, while the threshold used in 632 may be low, the second embodiment implements a variable threshold comparing identified dots in a local area.

In step 620 the device 102 may identify multiple pixels sharing the highest intensity in the local region. In a first example, the device 102 may determine if the multiple high intensity pixels adjoin or within a set proximity. For example, if the selected square section 604 has a length of y, the device 102 may determine that the multiple high intensity pixels are within y pixels of each other and may therefore be potentially included in the selected square section 604. The device 102 may limit the square sections in step 622 to square sections that include the multiple high intensity pixels. The device 102 may select one of the multiple high intensity pixels as a local maximum c or may average coordinates of the multiple high intensity pixels to use as coordinates of the local maximum c.

In the first example, if a size of the selected square section 604 is variable, the device 102 may select the size based on including the multiple high intensity pixels within the selected square section 604. For example, a first pixel and a second pixel may each have the highest intensity in the local region and may be located such that the first pixel and the second pixel may be included in a 3×3 square but not a 2×2 square (i.e., the high intensity pixels are not adjacent but are a pixel apart). The device 102 may determine the size of the selected square section 604 to be 3×3 to include both the first pixel and the second pixel as part of the same dot.

In a second example, the device 102 may select one of the multiple high intensity pixels as the local maximum c and temporarily ignore the other high intensity pixel(s). The device 102 may select the high intensity pixel based on a proximity to other high intensity pixels (such as maximum intensity pixels in other regions), an intensity of neighboring pixels, randomly or using any other method known to one of skill in the art. After identifying a selected square section 604 and determining that the selected square section 604 exceeds a threshold, as discussed above in step 632, the device 102 may determine if the selected square section 604 includes the other high intensity pixel(s). If the selected square section includes the other high intensity pixel(s), the device 102 may ignore the other high intensity pixel(s) included and proceed with identifying other dots in the portion 600. If the selected square section does not include one or more of the other high intensity pixel(s), the device 102 may select the one or more high intensity pixels as a local maximum c and repeat the steps to determine if a square section including the one or more high intensity pixels exceeds a threshold and may be identified as a dot.

As discussed above, a size of the square sections may be variable. If the size is variable, a number of square sections including the local maximum c found in step 622 may be based on each of the variable sizes and the search section 602 may be based on the largest size of the square sections. For example, if the square sections may be 2×2 or 3×3, the search section 602 may be 5×5 (3*2−1=5) and may include 13 square sections (four potential 2×2 square sections and nine potential 3×3 square sections) including the local maximum c. The device 102 may select (624) a square section having a maximum intensity of the thirteen potential square sections included in the search section 602. The device 102 may determine an average intensity for each of the potential square sections and may select a square section having the highest average intensity as the selected square section 604. Alternatively, the device 102 may sum an intensity of pixels in each of the potential square sections and then identify a 2×2 square section having the highest sum of the potential 2×2 square sections and/or a 3×3 square section having the highest sum of the potential 3×3 square sections. The device 102 may then select either the identified 2×2 square section or the identified 3×3 square section as the selected square section 604 based on a comparison or a threshold. As an example of a comparison, the device 102 may select the identified square section having the highest average intensity. As an example of a threshold, the device 102 may select the 3×3 square section if an average intensity of the 3×3 square section exceeds a threshold and select the 2×2 square section otherwise.

In step 624 the device 102 may determine that multiple square sections share the highest intensity. In a first example, the device 102 may use one or more various tiebreakers to select one of the square sections as the selected square section 604 based on an intensity of individual pixels. For example, the device 102 may identify a minimum pixel having a lowest intensity of pixels included in the square section for each of the multiple square sections. The device 102 may choose the square section having the highest intensity amongst the minimum pixels as the selected square section 604. Alternatively, the device 102 may sum an intensity of pixels in each of the potential square sections, excluding the minimum pixel in each of the potential square sections, and select a square section having the highest sum as the selected square section 604.

In a second example, the device 102 may increase a size of the selected square section 604 to include the multiple square sections sharing the highest intensity. For example, the device 102 may select a 3×3 square section that includes two 2×2 square sections sharing the highest intensity. In a third example, the device 102 may combine the multiple square sections into a rectangle. For example, if two 2×2 square sections overlap and share the highest intensity, the device 102 may combine them into a 2×3 or 3×2 rectangle.

Figure 7A:
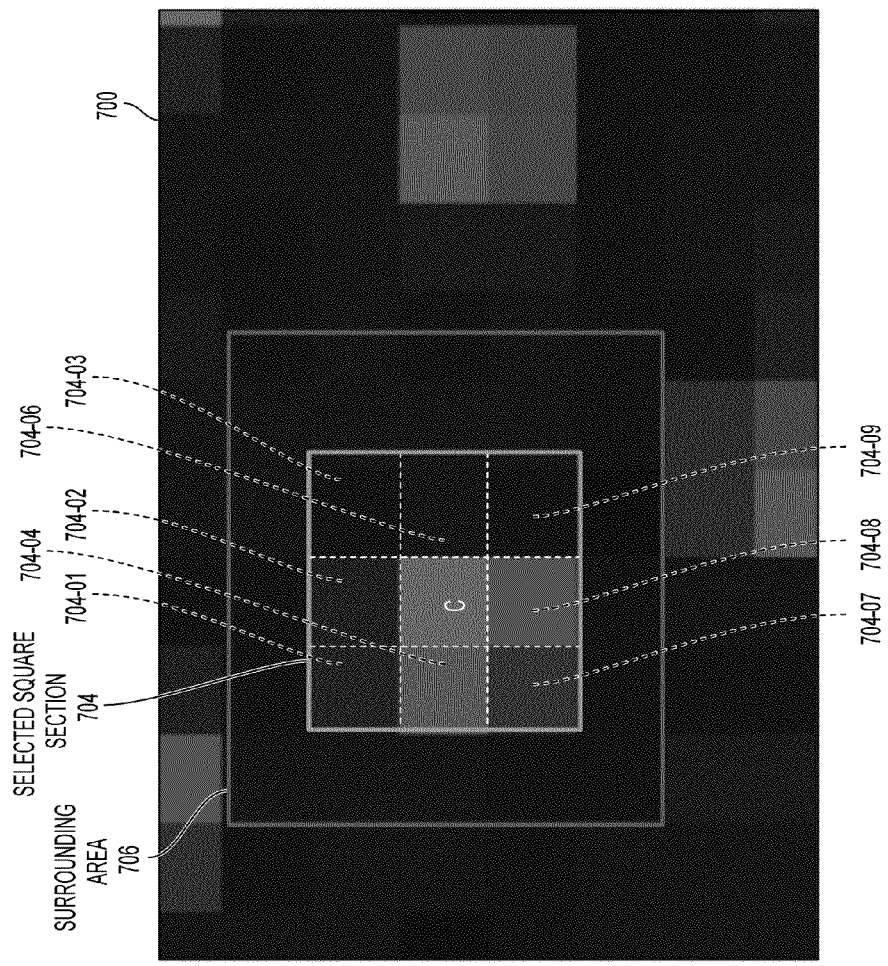
FIG. 7A illustrates an example of coordinates for an identified dot.

FIG. 7A illustrates an example of determining coordinates for an identified dot. The portion 700 of a captured image may include a 3×3 selected square section 704 including pixels 704-01 to 704-09. 704-05 is the local maximum c in the middle of the selected square section 704. Surrounding the selected square section 704 is a surrounding area 706.

Figure 7B:
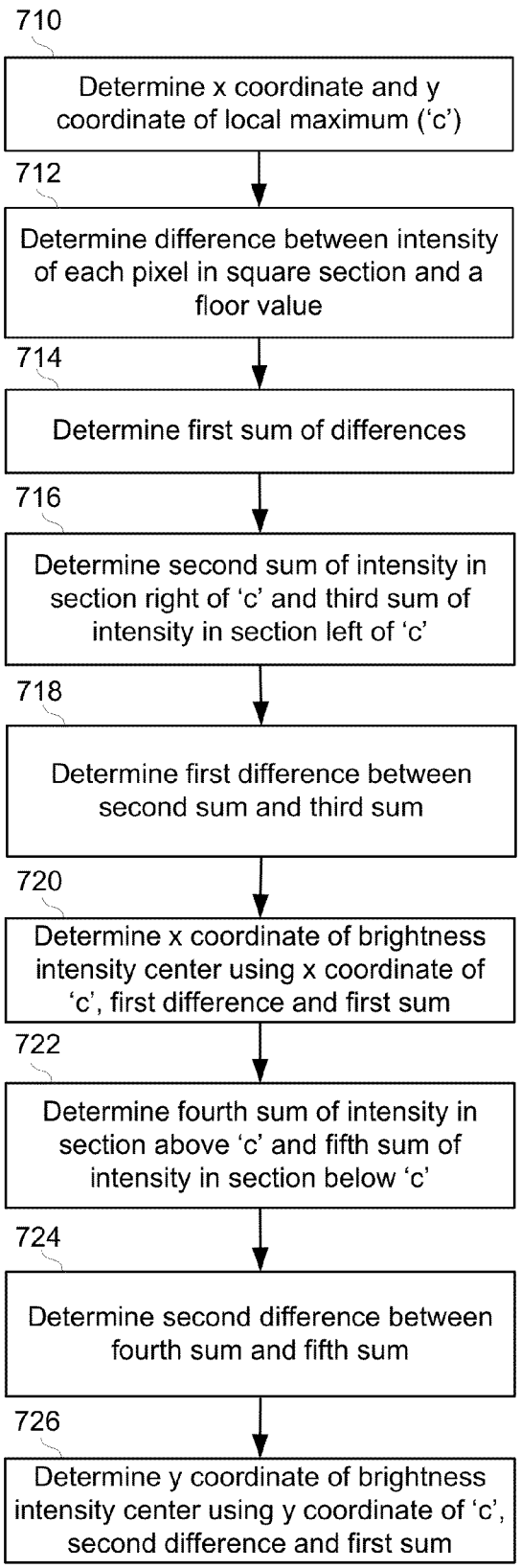
FIG. 7B illustrates a flowchart of a method for determining the coordinates of an identified dot.

FIG. 7B illustrates a flowchart of a method for determining the coordinates of the identified dot illustrated in FIG. 7A. The device 102 may identify dot coordinates of the dot in the captured image based on the dot's brightest part. For example, the device may determine coordinates of the local maximum and offset the coordinates based on the intensity of the surrounding area within the selected section.

The identified dot is the selected square section 704 with a local maximum c located in the middle. The device 102 may determine (710) an x coordinate and a y coordinate of the local maximum c. The device 102 may determine (712) a difference between an intensity of each pixel in the selected square section 704 and a floor value. The large area may include the entire captured image, a region such as the portion 700 of the captured image or any other region relatively larger than the selected square section 704. The floor value may be considered a background light source or a constant intensity for all pixels in a large area. The floor value may be predetermined. The floor value may be a minimum intensity in the large area, an average intensity for a fixed number of pixels having a lowest intensity (e.g. an average of 20 pixels having the lowest intensity), an average intensity for all pixels in the large area or some other value. Alternatively, the floor value may be predefined or set by the device 102. The device 102 may determine (714) a first sum of the differences calculated in step 712. For example, the device 102 may sum the difference between the intensity of each of pixels 704-01 through 704-09 and the floor value.

The device 102 may determine (716) a second sum of intensity in a first section right of the local maximum c and a third sum of intensity in a second section left of the local maximum c. For example, the second sum may include the intensity of the vertical column including pixels 704-03, 704-06 and 704-09, while the third sum may include the intensity of the vertical column including pixels 704-01, 704-04 and 704-07. The device 102 may determine (718) a first difference between the second sum and the third sum. The device 102 may determine (720) an x coordinate of an intensity center using the x coordinate of the local maximum c, the first difference and the first sum.

The device 102 may determine (722) a fourth sum of intensity in a third section above the local maximum c and a fifth sum of intensity in a fourth section below the local maximum c. For example, the fourth sum may include the intensity of the horizontal including pixels 704-01, 704-02 and 704-03, while the fifth sum may include the intensity of the horizontal row including pixels 704-07, 704-08 and 704-09. The device 102 may determine (724) a second difference between the fourth sum and the fifth sum. The device 102 may determine (726) a y coordinate of an intensity center using the y coordinate of the local maximum c, the second difference and the first sum.

In essence, the device 102 is calculating a centroid ("centroiding") of the selected square section 704 based on the intensity of pixels in the selected square section 704. The (x, y) coordinates of the intensity center may be considered the centroid. For example, the device 102 may use interpolation to take the (x, y) coordinates of the local maximum c and weight the (x, y) coordinates vertically and horizontally based on an intensity of the surrounding pixels to determine sub-pixel resolution.

If the selected square section 704 is larger than 3×3, the device 102 may include every pixel to the right of the local maximum c in the first section and every pixel to the left of the local maximum c in the second section. Similarly, the device 102 may include every pixel above the local maximum c in the third section and every pixel below the local maximum c in the fourth section.

Note that a vertical column and a horizontal row including the local maximum c is excluded if a length of the selected square section 704 is an odd number. If a length of the selected square section 704 is an even number, the device 102 may split the selected square section 704 in half horizontally so that a width of the first section is equal to a width of the second section and the vertical column including the local maximum c is included in one of the first section and the second section. Similarly, the device 102 may split the selected square section 704 in half vertically so that a height of the third section is equal to a height of the fourth section and the horizontal row including the local maximum c is included in one of the third section and the fourth section. For example, if the selected square section 704 was a 4×4 square including a vertical column to the left of 704-01 and a horizontal column below 704-07, the device 102 may group the vertical column including the local maximum c in the first section and the horizontal row including the local maximum c in the third section.

If the selected square section 704 is a rectangle instead of a square and the width of the rectangle is an odd number, the first section may include vertical columns to the right of the local maximum c and the second section may include vertical columns to the left of the local maximum c. If the width of the rectangle is an even number, the vertical column including the local maximum c may be included in one of the first section and the second section. Similarly the third section may include all horizontal rows above the local maximum c and the fourth section includes all horizontal rows below the local maximum c if the height of the rectangle is an odd number. If the height of the rectangle is an even number, the horizontal row including the local maximum c is included in one of the third section and the fourth section.

Based on the methods described above with regard to FIGS. 6A-7B, the device 102 may identify individual dots in the captured image and the reference image(s) and may identify exact coordinates and sizes for the dots based on the brightness intensity centers and the selected square sections, respectively. In addition, the device 102 may identify first pixels associated with the dots (along with coordinates for brightness centers of the dots) and second pixels not associated with the dots.

FIG. 8A illustrates an example of an embodiment for setting a search region for correlating dots in a captured image to dots in reference image(s) using a binary technique. The binary technique may act as a broad filter and determine an approximate correlation between a dot in the captured image and a dot in the reference image(s), and the device 102 may set the search region based on the approximate correlation. For example, the device 102 may simplify a portion of the captured image to a dot mapping 802 and corresponding binary patch 804 such that pixels corresponding to a dot are represented by a 1 and pixels not corresponding to a dot are represented by a 0. As an alternative to the binary patch 804, the device 102 may weight the pixels based on a proximity to a dot using values between 0 and 1 (or other values). In addition, the device 102 may simplify the reference image(s) to binary patches similar to the binary patch 804. The binary patch 804 (or other weighted patch) of the captured image may be compared to dots (or binary/weighted patches) in reference image(s) to find a potential match 806. To reduce a search area, the device 102 may set a search region that includes one or more potential matches 806.

Figure 8B:
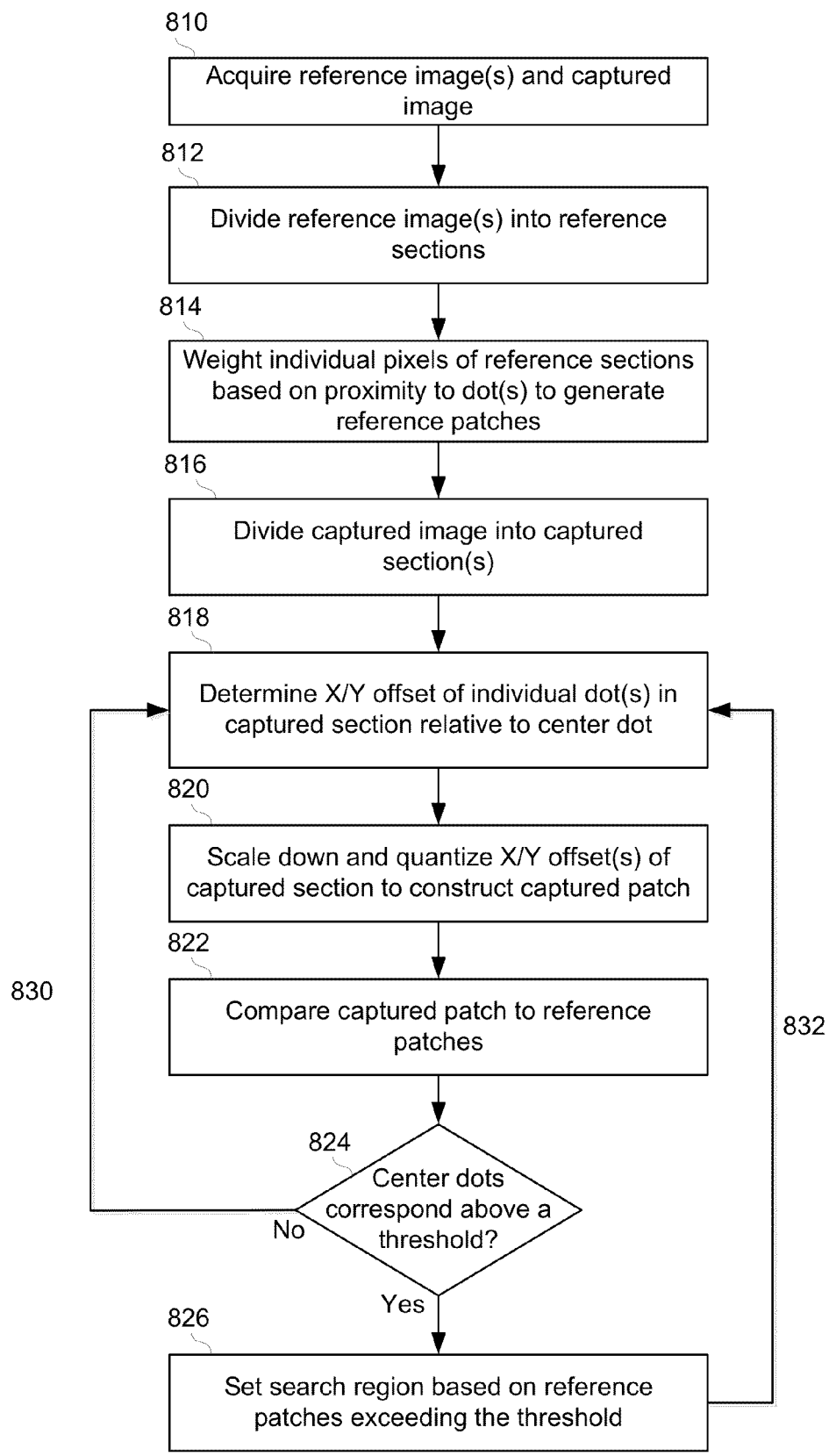
FIG. 8B illustrates a flowchart of a method for setting a search region for a dot.

FIG. 8B illustrates a flowchart of a method for setting a search region. The device 102 may acquire (810) reference image(s) and a captured image. The reference image(s) and the captured image each include dots with corresponding coordinates for respective intensity centers associated with individual dots.

The device 102 may divide (812) the reference image(s) into reference sections and weight (814) individual pixels of the reference sections based on each pixel's proximity to the dot(s) to generate reference patches, similar to the binary patch 804. As an alternative to the binary patch 804, the device 102 may weight the pixels based on a proximity to a dot using values between 0 and 1 (or other values). For example, a pixel corresponding to a dot may have a weight of 1, a pixel adjacent to a dot may have a weight of 0.8, a pixel two pixels from a dot may have a weight of 0.3, and pixels three or more pixels from a dot may have a weight of 0. However, these weights are used as an example and the disclosure is not limited thereto.

The device 102 may divide (816) the captured image into one or more captured section(s). The captured section(s) may be centered around a dot that is to be compared to dots in the reference image(s) to find dot matches between the captured section(s) and the reference image(s). The device 102 may determine (818) an (x, y) offset of individual dot(s) in a particular captured section relative to the center dot of the captured section and scale (820) down and quantize the (x, y) offset(s) of the captured section to generate a captured patch. The device 102 may compare (822) the captured patch to one or more reference patches. If the device 102 determines (824) that the center dots of the captured patch and of one or more reference patch(es) correlate to each other above a threshold correlation score, the device 102 may set (826) a search region based on the reference patch(es) exceeding the threshold. If the device 102 determines (824) that the center dot of the captured patch does not correspond to a center dot of the one or more reference patches above a threshold, the device 102 may loop (830) back to step 818 and repeat the steps for another captured section. Similarly, if the device 102 sets a search region for the captured patch in step 826, the device 102 may loop (832) back to step 818 to repeat the steps for another captured section. Thus, the device 102 may continue processing dots and sections until a correlating match is found. The device 102 may then repeat the dot correlation for multiple dots in the captured image.

For a particular captured section, a corresponding search region may include one or more reference patches. The search region may include a continuous region, such as an area encompassing the one or more reference patches plus intermediate areas of the reference image(s) between the one or more reference patches, or discrete regions, such as the one or more reference patches by themselves. In addition, the device 102 may limit the search region to exclude at least one reference patch that corresponds to the captured patch based on a location of the at least one reference patch. For example, the device 102 may limit the search region based on a search region of neighboring captured patches. Thus, if the device 102 identifies a first section of the reference image(s) as a first search region for a first captured patch, the device 102 may ignore potentially corresponding reference patches outside of the first section of the reference image(s) for a second captured patch neighboring the first captured patch. Instead, the device 102 may set a second search region based on potentially corresponding reference patches located in the first section of the reference image(s). Therefore, the device 102 may dynamically change or modify the search range as the device 102 correlates more dots between the captured image and the reference image(s).

While FIG. 8B illustrates the device 102 comparing a captured patch to one or more reference patches, the disclosure is not limited thereto. Instead, the device 102 may compare a reference patch to one or more captured patches without departing from the disclosure. If the reference patch is compared to one or more captured patches, the device 102 may perform the steps illustrated in FIG. 10 similarly, so that the device 102 compares a reference patch to one or more captured patches using the search region set in step 826.

The steps illustrated in FIG. 8B are intended to provide an approximate correlation to decrease a size of a search region and increase a speed of processing. However, the steps illustrated in FIG. 10 may be performed without performing the steps of FIG. 8B. Instead, a search region may be approximated or may be obtained by the device 102 from memory, external storage or external input. Alternatively, if no search region is set, the device 102 may default the search region to include the entirety of the reference image. The device 102 may modify the search region dynamically based on location(s) of dot(s) in the reference image correlated to neighboring dot(s) in the captured image. Thus, the search region may include previous dot matching results for the neighboring dot(s).

FIG. 9A illustrates examples of processing an image to create a patch to be used to correlate dots. FIG. 9A illustrates a normal section 902, a weighted section 904, a synthesized section 906 and an approximated Gaussian distribution 908. The normal section 902 is an example of a portion of an image and includes a plurality of pixels with different intensities associated with each pixel. The normal section 902 may include several dots, which the device 102 may identify based on the intensity of the pixels using the steps described in greater detail above. After identifying the dots, the device 102 may weight the section 902 to generate the weighted section 904. For example, the device 102 may identify first pixels associated with the dots and second pixels not associated with the dots and may selectively remove intensity information in the normal section 902 such that the first pixels are left alone and second pixels are set to a value of zero (black). In this example, the value of zero may indicate that the pixel is set to a lowest intensity and/or set to a particular color, such as black. While the weighted section 904 only illustrates a single dot 905, the weighted section 904 could include multiple dots without departing from the disclosure. If the weighted section 904 was illustrated including multiple dots, the multiple dots would be separated by pixels having an intensity value of zero (i.e., blacked out).

The device 102 may synthesize the weighted section 904 to generate the synthesized section 906. For example, the device 102 may generate a synthesized dot image 907 and superimpose the synthesized dot image 907 on the first pixels based on the coordinates for a brightness center of the dot 905. As an illustration, the dot 905 may be a first size and centered on a first coordinate, so the synthesized dot image 907 may be generated based on the first size and may be inserted on the first coordinate. Therefore, intensities of pixels included in the synthesized dot image 907 may be evenly distributed as a bell shaped curve in the synthesized section 906. As the synthesized dot image 907 is superimposed over the first dot 905, identifying precise coordinates of the first dot 905 using the methods described above with regard to FIGS. 6A-7B is beneficial and may increase a correlation between dots in the captured image and dots in the reference image(s).

The synthesized dot image 907 may be based on an ideal Gaussian distribution or an approximated Gaussian distribution. An example of an approximated Gaussian distribution is approximated Gaussian distribution 908, which may approximate the ideal Gaussian distribution using values of power of 2 (e.g. 16, 8, 4, 2) and may be saved in a lookup table. As the approximated Gaussian distribution 908 is saved in a lookup table, a processing time may be reduced compared to calculating the ideal Gaussian distribution for individual dots.

While the device 102 may apply the same approximated Gaussian distribution 908 for dots, the disclosure is not limited thereto. Instead, the device 102 may use several approximated Gaussian distributions and may select an individual approximated Gaussian distribution based on a size of a dot.

The ideal Gaussian distribution may require more processing time than the approximated Gaussian distribution, but may result in a higher correlation. The ideal Gaussian distribution may be calculated based on a size of an individual dot using the following equation:

$$f(x, y) = A\exp\left(-\left(\frac{(x-x_o)^2}{2\sigma_x^2} + \frac{(y-y_o)^2}{2\sigma_y^2}\right)\right),$$

where $f(x,y)$ is the synthesized dot image. $(x_o,y_o)$ is the center of the individual dot, A is a variable determined by the device 102, $\sigma_x$ is a standard deviation in the x direction and $\sigma_y$ is a standard deviation in the y direction. As an example, the device 102 may first detect the individual dot and compute $(x_o,y_o)$ for the individual dot. Centered at $(x_o,y_o)$, the device 102 may apply the equation $f(x, y)$ for every $(x,y)$ within a range defined by $(\sigma_x, \sigma_y)$. For example, x may range between (x_min, x_max), where x_min=$x_o$–3*$\sigma_x$ and x_max=$x_o$+3*$\sigma_x$. Within the range, the device 102 may set a grid giving x and y a granularity of dx and dy, respectively. Therefore, x takes the values of x_min+dx, x_min+2*dx, x_min+3*dx ... x_max. The same process may be used for y. Note that dx and dy can be at sub-pixel accuracy. In a first embodiment, the device 102 may quantize $f(x,y)$ to an integer pixel resolution. For example, the device 102 may use the $f(x,y)$ at the center of the pixel as the value for that pixel, or a summation of $f(x,y)$ for $(x,y)$ belonging to that pixel. In a second embodiment, the device 102 may compute $f(x,y)$ using a sub-pixel resolution for both the reference and test image. While the correlation computational cost is higher than the first embodiment, the correlation result may have a better resolution using the second embodiment.

Figure 9B:
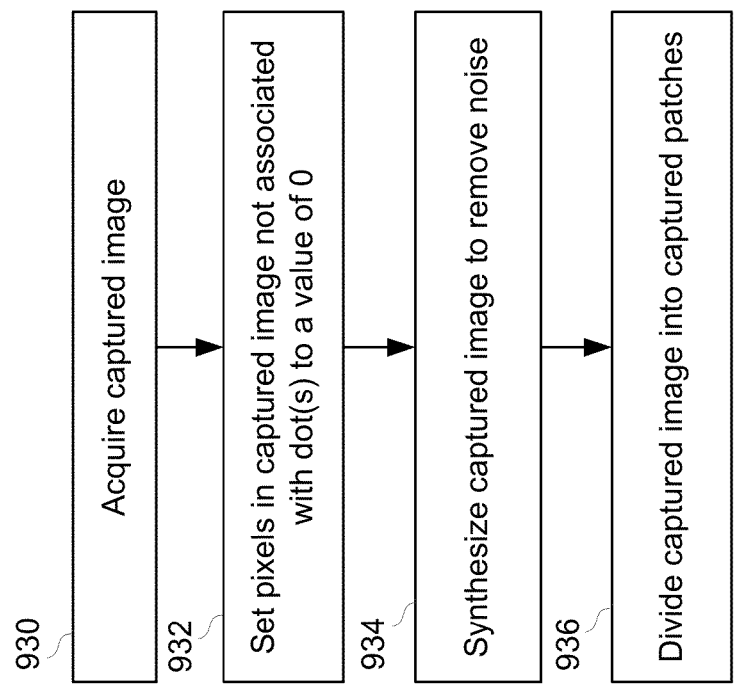
FIG. 9B illustrates a flowchart of a method for processing a reference image.

As discussed above, one or more reference images may be used to provide dots for correlation with the dots in the captured image(s). FIG. 9B illustrates a flowchart of a method for processing a reference image. This processing may happen ahead of time, such as during system calibration or otherwise prior to run time. The device 102 may acquire (910) a reference image including a plurality of dots. The device 102 may set (912) pixels in the reference image that are not included in the plurality of dots to an intensity (or other) value of zero, while leaving the pixels included in the plurality of dots untouched. Thus, the pixels in the dot remain bright but any residual brightness in non-dot pixels is removed when the non-dot pixels are set to 0 (i.e., black). For example, the device 102 may select a plurality of pixels in the reference image as a first selection, remove first pixels included in the dots to generate a second selection having second pixels, and set a value of the second pixels in the second selection to zero. As discussed above, the value of zero may indicate that the pixel is set to a lowest intensity and/or set to a particular color, such as black.

The device 102 may then synthesize (914) the reference image to evenly distribute intensities of pixels associated with the dots. In a first embodiment, the device 102 may generate synthesized dot images and superimpose the synthesized dot images on the first pixels based on the coordinates for a brightness center of the dots. As illustrated in FIG. 9A, a dot 905 may be a first size and centered on a first coordinate, so the device 102 may generate a synthesized dot image 907 based on the first size and may insert the synthesized dot image 907 on the first coordinate. Therefore, intensities of pixels included in the synthesized dot image 907 may be evenly distributed as a bell shaped curve in the synthesized section 906. In a second embodiment, the device 102 may process the reference image with a function that approximates a point-spread-function (PSF) of the camera 106 used to capture the reference image. For example, the device 102 may process the reference image by convolving the reference image using a two-dimensional Gaussian function to blur the reference image. The two-dimensional Gaussian function may be calculated using the equation above and may result in an even distribution intensities of pixels associated with the dots. Alternatively, the device 102 may use any analogous method used to remove noise and/or evenly spread intensities of pixels associated with the dots in the reference image. By reducing the noise and evenly spreading intensities of pixels associated with the dots in the reference image(s), the device 102 may make it easier to correlate a dot in the captured image to a dot in the reference image(s).

The device 102 may divide (916) the reference image into reference patches, and each of the reference patches may be centered on a one of the plurality of dots included in the reference image. Note that the device 102 may perform step 916 prior to steps 912 and 914 without departing from the disclosure. In addition, the device 102 may repeat these steps for multiple reference images.

Figure 9C:
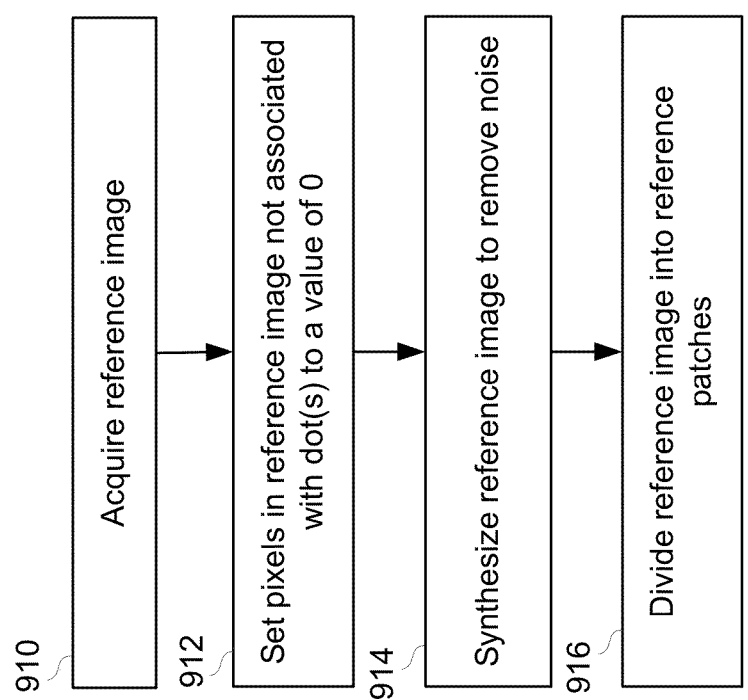
FIG. 9C illustrates a flowchart of a method for processing a captured image.

FIG. 9C illustrates a flowchart of a method for processing a captured image. The device 102 may acquire (930) the captured image including a plurality of dots. The device 102 may set (932) pixels in the captured image that are not included in the plurality of dots to an intensity value of zero, while leaving the pixels included in the plurality of dots untouched. Thus, the pixels in the dot remain bright but any residual brightness in non-dot pixels is removed when the non-dot pixels are set to 0 (i.e., black). For example, the device 102 may select a plurality of pixels in the captured image as a first selection, remove dot pixels included in the plurality of dots to generate a second selection, and set a value of the pixels in the second selection to zero. As discussed above, the value of zero may indicate that the pixel is set to a lowest intensity and/or set to a particular color, such as black.

The device 102 may then synthesize (934) the captured image to evenly distribute intensities of pixels associated with the dots. In a first embodiment, the device 102 may generate synthesized dot images and superimpose the synthesized dot images on the first pixels based on the coordinates for a brightness center of the dots. As illustrated in FIG. 9A, a dot 905 may be a first size and centered on a first coordinate, so the device 102 may generate a synthesized dot image 907 based on the first size and may insert the synthesized dot image 907 on the first coordinate. Therefore, intensities of pixels included in the synthesized dot image 907 may be evenly distributed as a bell shaped curve in the synthesized section 906. In a second embodiment, the device 102 may process the captured image with a function that approximates a point-spread-function (PSF) of the camera 106 used to capture the capture image. For example, the device 102 may process the captured image by convolving the reference image using a two-dimensional Gaussian function to blur the captured image. The two-dimensional Gaussian function may be calculated using the equation above and may result in an even distribution intensities of pixels associated with the dots. Alternatively, the device 102 may use any analogous method used to remove noise and/or evenly spread intensities of pixels associated with the dots in the reference image. By reducing the noise and evenly spreading intensities of pixels associated with the dots in the captured image, the device 102 may make it easier to correlate a dot in the captured image to a dot in the reference image(s). The device 102 may divide (936) the captured image into captured patches, and each of the captured patches may be centered on a one of the plurality of dots included in the captured image. Note that the device 102 may perform step 936 prior to steps 932 and 934 without departing from the disclosure.

Figure 10:
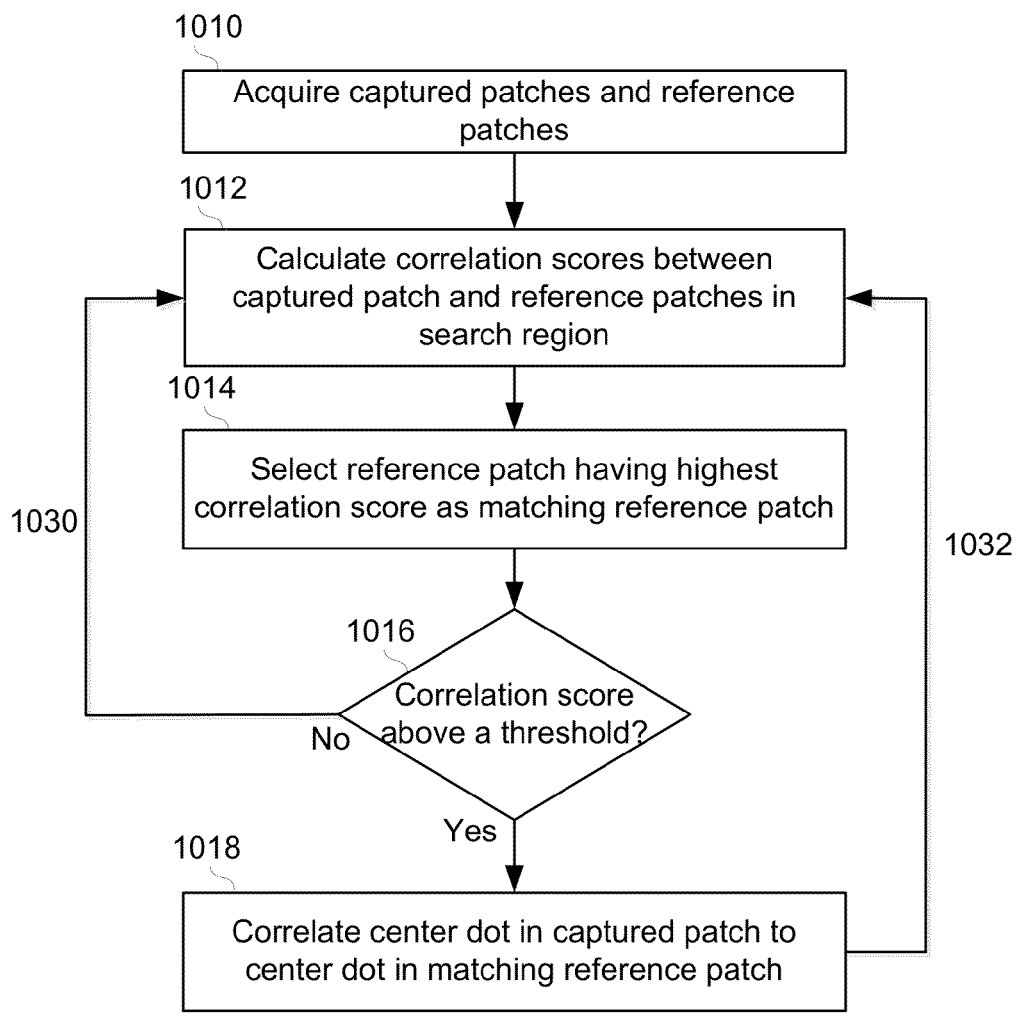
FIG. 10 illustrates a flowchart of a method for correlating a dot between a captured image and reference image(s).

FIG. 10 illustrates a flowchart of a method for correlating dot(s) between a captured image and reference image(s) using captured patches and reference patches. The device 102 may correlate a dot in the captured image to a dot in the reference image based on a search region. For example, the device 102 may compare a captured patch with several reference patches within the search region. Based on a correlation score calculated using a correlation formula (described below), the device 102 may match the captured patch with a particular reference patch and correlate a center dot in the captured patch to a center dot in the particular reference patch.

The device 102 may acquire (1010) captured patches synthesized from the captured image and reference patches synthesized from the reference image(s). For example, the device 102 may perform the methods illustrated in FIGS. 9B and 9C or may access the captured patches and the reference patches from memory or storage. The device 102 may calculate (1012) correlation scores between a captured patch and reference patches included in a search region. The search region may be set using the method illustrated in FIG. 8B, although the disclosure is not limited thereto. Increasing the search region may increase a number of correlation scores calculated as additional reference patches are included in the search region. The correlation scores may be calculated using a correlation formula, which is discussed in greater detail below. The device 102 may select (1014) a matching reference patch having a highest correlation score from the reference patches included in the search region. The device 102 may determine (1016) if the correlation score for the matching reference patch exceeds a threshold. If the correlation score exceeds the threshold, the device 102 may correlate (1018) a center dot in the captured patch (of the plurality of dots in the captured image) to a center dot in the matching reference patch (of the plurality of dots in the reference image (s)). After correlating the center dot in the captured patch to the center dot in the matching reference patch, the device 102 may loop (1032) to step 1012 and repeat steps 1012, 1014, 1016 and potentially 1018 for another captured patch.

After performing step 1018 and correlating the center dot in the captured patch to the center dot in the reference patch, the device 102 may calculate depth information using any method known to one of skill in the art. For example, the device 102 may calculate depth information for a particular dot using coordinates of the center dot in the captured patch and coordinates of the center dot in the corresponding reference patch. Based on these two coordinates, the device 102 may determine an approximate distance from the camera 106 to the particular dot and store the approximate distance as depth information corresponding to the particular dot.

If the device 102 uses multiple reference images, dot(s) may be correlated between the multiple reference images. For example, when the device 102 correlates the dot from the captured image to a dot in a reference image, the device 102 may correlate the dot from the captured image to dots in each of the multiple reference images. Therefore, when the device 102 calculates depth information, the device 102 may determine the depth information based on correlated dot pairs in multiple reference images. Alternatively, the device 102 may select one reference image from the multiple reference images based on coordinates of the correlated dot, and may calculate the depth information using the coordinates of the correlated dot in the selected reference image. For example, the device 102 may identify coordinates of correlated dots in the reference images and may determine which coordinates are closest to coordinates of the dot from the captured image. The device 102 may then select one or more reference images based on a proximity between the coordinates of the correlated dots and the coordinates of the dot from the captured image.

The device 102 may finish correlating dots in the captured image to corresponding dots in the reference image(s) prior to calculating depth information for the dots in the captured image. As an alternative, the device 102 may determine depth information for the center dot in the captured patch prior to correlating additional dots. Based on the depth information, the device 102 may modify a search region or the reference image(s) used for dots neighboring the center dot in the captured patch. For example, the device 102 may determine that a first dot in a captured image correlates to a second dot in a first reference image. Based on the first dot and the correlated second dot, the device 102 may determine that the first dot has/appears at a first depth, for example, 5 m. However, the first reference image may be associated with a depth of 1 m. To potentially improve correlation results for a third (or other) dot in the captured image neighboring the first dot, the device 102 may increase the search region associated with the first reference image or may search a second reference image taken at approximately the first depth (e.g., 5 m). Alternatively, in step 1012 the device 102 may calculate correlation scores between a captured patch and reference patches associated with multiple reference images having varying depths. For example, the device 102 may compare the captured patch to several reference patches from multiple reference images, despite some of the reference patches having correlated center dots.

If the device 102 determines that the correlation score for the matching reference patch does not exceed the threshold in step 1016, the device 102 may loop (1030) to step 1012 and repeat steps 1012, 1014 and 1016 for another captured patch. As a first example, the device 102 may determine that the center dot in the captured patch is a false positive due to the low correlation, as discussed above with regard to FIG. 6, and may discard the center dot. Alternatively, the device 102 may repeat steps 1012, 1014 and 1016 using a different search region for the captured patch. For example, the search region may be increased to include additional reference patches. As a third example, the device 102 may identify the captured patch as a failed captured patch and store or ignore the failed captured patch until additional dots in the captured image are correlated to dots in the reference image(s). For example, the device 102 may wait until a majority of the dots in the captured image are correlated to dots in the reference image(s). Alternatively, the device 102 may wait until steps 1012, 1014 and 1016 are performed on each of the dots in the captured image. The device 102 may then repeat steps 1012, 1014 and 1016 for the failed captured patch, calculating correlation scores between the failed captured patch and remaining reference patches. If the device 102 determines that the stored center dot is a True Positive, the device 102 may select a reference patch as a matching reference patch even if the correlation does not exceed the threshold. For example, the device 102 may use a first threshold for the captured patches originally and may use a second, lower threshold for the failed captured patches.

Thus, the device 102 may use a block matching method or algorithm to find corresponding sub-images between the captured image and the reference image(s). The blocks may be a sub-image of size (width (w), height (h)), with a captured patch indicated as block X and a reference patch indicated as block Y. An example of the block size (w, h) may be (23 pixels, 23 pixels) and an example of a search region size (w, h) may be (100 pixels, 100 pixels), although the disclosure is not limited thereto. For example, the block may be any size, with lower values for (w, h) decreasing a processing time and an odd number for (w, h) centering the block on a single pixel. Similarly, examples of additional search region sizes may be (100, 100), (250, 250) or (200, 50). As discussed above, the search region may be determined based on the steps performed in FIG. 8B, may be approximated, may be obtained by the device 102 from memory, external storage or external input or may be set as the entirety of the reference image(s). In addition, the search region may be dynamically changed based on previous correlations, for example by limiting the search region based on a correlation of neighboring dots (neighboring captured patches) in the captured image.

The correlation score between a captured patch and reference patches may be calculated using a correlation formula or algorithm known to one of skill in the art. One example of a correlation equation is the Pearson product-moment correlation coefficient, which may be calculated as:

$$\Sigma((X_i - X\text{bar})*(Y_i - Y\text{bar}))/(\text{std}(X)*\text{std}(Y)) \tag{1}$$

for i=1 . . . n, where n is a natural number and corresponds to the last pixel in the captured patch X, $X_i$ is a pixel in the captured patch (X), Xbar an average intensity for the captured patch (X), Y, is a pixel in the reference patch (Y), Ybar is an average intensity for the reference patch (Y), std(X) is a standard deviation for the captured patch (X) and std(Y) is a standard deviation for the reference patch (Y). Thus, a single captured patch may be compared to multiple reference patches by calculating a correlation score between the captured patch (X) and each of the multiple reference patches ($Y_1$, $Y_2$, $Y_3$, etc.). First, the device 102 may determine a first difference between an intensity of each pixel ($X_i$) in the captured patch (X) and an average intensity (Xbar) for all pixels in the captured patch (X). The device 102 may then sum the first differences. The device 102 may determine a second difference between an intensity of each pixel (Y) in a first reference patch ($Y_1$) and an average intensity (Ybar) for all pixels in the reference patch (Y). The device 102 may then sum the second differences. The device 102 may calculate a first standard deviation for pixels in the captured patch [std(X)] and a second standard deviation for pixels in the reference patch [std(Y)]. The device 102 may then multiply the sum of the first differences by the sum of the second differences in the numerator and multiply the first standard deviation by the second standard deviation in the denominator to calculate a correlation score for the first reference patch ($Y_1$). After repeating these steps for each of the multiple reference patches ($Y_1$, $Y_2$, $Y_3$, etc.), the device 102 may select the reference patch having the highest correlation score as the matching reference patch.

The second example correlation chart 204 illustrated in FIG. 2 provides an example of correlating images according to the method of FIG. 10. In contrast to the poor correlation illustrated in the first example correlation chart 202, the second example correlation chart 204 is based on a captured region of a captured image and reference regions of reference image(s) when the captured image and the reference image(s) are processed according to some example embodiments. As a result of processing the captured image and/or the reference image(s), the second example correlation chart 204 has a single reference region having a high correlation score for the captured region, shown by peak 250. Therefore, the device 102 may match the single reference region to the captured region. The device 102 may generate a correlation chart similar to the second example correlation chart 204 for individual captured regions, identifying individual reference regions correlating to the individual captured regions. Based on the captured regions and corresponding matching reference regions, the device 102 may correlate dots in the captured image to dots in the reference image.

The device 102 may determine a single peak within the search region, the single peak indicating a single reference patch having a high correlation score relative to the captured patch. The device 102 may match the reference patch to the captured patch based on the high correlation score. However, the device 102 may instead determine multiple peaks indicating multiple reference patches having a high correlation score relative to the captured patch. The device 102 may then select a reference patch having the highest correlation score to the captured patch as the matching reference patch. Alternatively, if several reference patches are correlated (indicating a single dot in the projected dot pattern included in multiple reference images), the device 102 may select a reference patch having the highest correlation score to the captured patch from the group of correlated reference patches as the matching reference patch.

While FIG. 10 illustrates a captured patch being compared to reference patches, the disclosure is not limited thereto. Instead, a reference patch may be compared to captured patches without departing from the disclosure.

A location of the projector 104 may be fixed relative to a location of the camera 106. For example, the projector 104 and the camera 106 may be oriented so that a front of the projector 104 is on a plane with a front of the camera 106. Alternatively, the projector 104 may be in front of or behind the camera 106 and/or oriented at an angle to the camera 106 in a fixed position. In these examples, because the projector 104 is fixed relative to the camera 106, the device 102 may reliably measure depth information after an initial calibration. For example, the device 102 may be calibrated during the manufacturing process to consistently measure depth information based on the fixed positions of the projector 104 and the camera 106. As an alternative, a location of the projector 104 may vary relative to a location of the camera 106. For example, the projector 104 and/or the camera 106 may be an external device and the relative positions of the projector 104 and the camera 106 may vary. In this example, the device 102 may require an additional calibration each time the relative positions of the projector 104 and the camera 106 change. For example, the device 102 may be assembled at a first location and a calibration performed prior to the device 102 measuring depth information. If the device 102 is moved to a second location (or the projector 104 and camera 106 are moved relative to each other), the device 102 may require another calibration before measuring depth information. During calibration and subsequent measuring of depth information, a location of the projector 104 may be temporarily fixed relative to a location of the camera 106.

Figure 11:
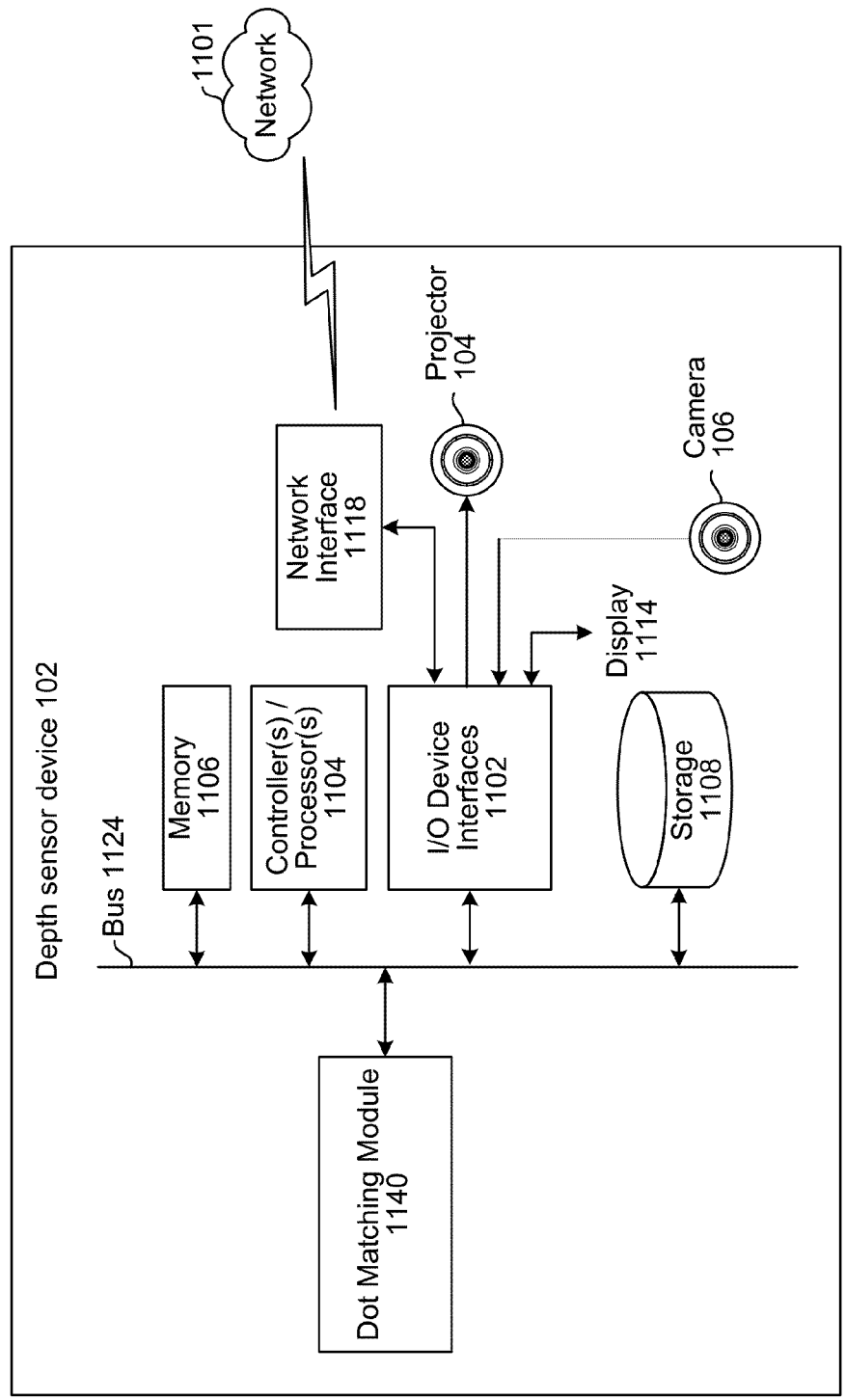
FIG. 11 illustrates a block diagram conceptually illustrating components of a depth sensor device.

The device 102 may be calibrated by taking reference images under known conditions. A location of the projector 104 and the camera 106 may vary between different devices 102 or between different configurations of the device 102. However, the location of the projector 104 should remain fixed relative to the location of the camera 106 while measuring depth information or else the device 102 may require an additional calibration. The device 102 may obtain values for the relationship between the projector 104 and camera 106, and how the camera 106 captures individual projected dots, to use for calculating depth information. For example, the device 102 may project (using the projector 104) a dot pattern on a plane, such as a flat wall or screen, and may capture (using the camera 106) an image showing the dots at a fixed distance. The images taken during the calibration process may be referred to as calibration images. This process may be repeated for multiple calibration images within a desired range. For example, the fixed distances of the plane relative to the device 102 may be a distance of 1.3 m and a distance of 3.0 m, although an accuracy of the calibration may be increased by capturing additional images at additional fixed distances. The device 102 may process the calibration images to correlate dots of the projected dot pattern between the calibration images using the method described in greater detail above. Based on coordinates of the correlated dots, the device 102 may determine the relationship between projected dots and captured dots that will be used when eventually determining the shape/depth of objects at runtime. Using these relationships, the device 102 may generate one or more reference images based on the calibration images. FIG. 11 illustrates a block diagram conceptually illustrating components of a depth sensor device 102. Other components not illustrated may also be included in the device 102. In operation, the device 102 may include computer-readable and computer-executable instructions that reside in storage 1108 on the device 102. The device 102 may be a handheld device or may be part of a larger device or system. For example, the device 102 may be a handheld device and may include a projector 104 and a camera 106 within a small housing (not shown), such as a portable scanning device. Alternatively, the device 102 may be a processor located in a housing (not shown) and the device 102 may be coupled to a projector 104 and a camera 106 located external to the housing, such as a set top box or a gaming system. As another example embodiment, the device 102 may include an integrated projector 104 and integrated camera 106 within a large housing, such as a 3D video camera. Each of the projector 104 and the camera 106 may be located internal or external to the housing and may be included within the device 102 or may be coupled to the device 102 without departing from the disclosure.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, object sensing systems, gaming systems, set-top boxes, 3D imaging systems, etc.

The device 102 may include one or more controller(s)/processor(s) 1104 comprising one-or-more central processing units (CPUs) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The device 102 may also include a data storage component 1108 for storing data and processor-executable instructions. The data storage component 1108 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 1102.

Executable instructions for operating the device 102 and its various components may be executed by the controller(s)/processor(s) 1104, using the memory 1106 as temporary "working" storage at runtime. The executable instructions may be stored in a non-transitory manner in non-volatile memory 1106, storage 1108, or an external device. Alternatively, some or all of the executable instructions may be embedded in hardware or firmware in addition to or instead of software.

As shown in FIG. 11, the device 102 may be communicatively coupled with other components of device 102 via input/output (I/O) device interfaces 1102 and/or via an address/data bus 1124. The address/data bus 1124 conveys data among components of the device 102. Several of each of these components may be included. Each component within the device 102 may also be directly connected to other components in addition to (or instead of) being connected to other components across the bus 1124. Also, although shown as integrated within device 102, some or parts of the various components may be external to device 102 and accessed through input/output device interfaces 1102 either wirelessly or through a physical connection.

The input/output (I/O) device interfaces 1102 may include an interface for an external peripheral device connection such as universal serial bus (USB), FireWire, Thunderbolt or other connection protocol. The device 102 may also include one or more buttons (not shown) or other input components such as a keyboard (not shown). Pointing devices for interacting with a graphical user interface (GUI) may be included, such as a touchpad, a trackball, or a mouse.

The network interface 1118 and related components (e.g., radio transmitter/receiver/transceiver, modem, Ethernet port, etc.) may be configured to operate with a network 1101, for example a wired network, a wireless local area network (WLAN) (such as WiFi), Bluetooth, and/or wireless networks, such as a Long Term Evolution (LTE) network, WiMAX network, 3G network, etc.

The device 102 may also include a video output component for displaying images, such as display 1114. The video output component may be a display of any suitable technology, such as a liquid crystal display, an organic light emitting diode display, electronic paper, an electrochromic display, a pico projector, etc. The video output component may be integrated into the device 102 or may be separate.

As discussed above, the device 102 includes controller(s)/processor(s) 1104, memory 1106, and storage 1108. In addition, the device 102 may include a dot matching module 1140, which may comprise processor-executable instructions stored in storage 1108 to be executed by controller(s)/processor(s) 1104 (e.g., software, firmware), hardware, or some combination thereof. For example, components of the dot matching module 1140 may be part of a software application running in the foreground and/or background on the device 102.

The dot matching module 1140 may be configured to receive a captured image and one or more reference images, to identify dots in the captured image, to determine coordinates of the dots in the captured image, to set a search region in the one or more reference images for individual dot(s) in the captured image, to process the captured image to weight and synthesize pixels associated with dots in the captured image, to correlate dot(s) in the captured image to dot(s) in the one or more reference images, and to calculate depth information for the dot(s) in the captured image using the correlated dot(s) in the one or more reference images. Thus the dot matching module may perform the steps described in FIGS. 6B, 7B, 8B, 9B, 9C, and 10 above.

The dot matching module 1140 may be connected to the bus 1124, input/output interfaces 1102, controller(s)/processor(s) 1104, and/or other component of the device 102. For example, images sent to the dot matching module 1140 may come from the storage 1108, the camera 106 via the input/output interfaces 1102, and/or the network 1101 via the network interface 1118.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for determining depth information of an object, the method comprising:
projecting, using a projector, a plurality of projected dots on a flat surface;
acquiring a reference image from a camera, the reference image including the plurality of projected dots;
projecting, using the projector, the plurality of projected dots on an object;
acquiring a captured image from the camera, the captured image including a plurality of captured dots appearing on the object;
identifying a captured region of the captured image, the captured region including a captured dot of the plurality of captured dots;
identifying a brightness center in the captured region, the brightness center having a highest brightness intensity in the captured region
identifying the captured dot based on the brightness center;
determining first coordinates for the captured dot;
setting a brightness intensity of pixels not associated with the captured dot to zero in the captured region;
replacing the captured dot with a synthesized dot to generate a captured patch, brightness intensities of pixels in the synthesized dot having an approximately Gaussian distribution;
dividing the reference image into a plurality of reference patches;

calculating correlation scores between the captured patch and each of the plurality of reference patches, each correlation score indicating an amount of correlation between the captured patch and one of the plurality of reference patches;

selecting a first reference patch having a highest correlation score of the correlation scores;

associating the captured dot with a reference dot in the first reference patch, the reference dot having second coordinates; and calculating depth information of the object based on the first coordinates and the second coordinates.

2. The computer-implemented method of claim 1, wherein identifying the captured dot comprises:

determining a plurality of squares containing the brightness center;

determining a brightness score for each of the plurality of squares;

selecting a first square having a highest brightness score of the plurality of squares;

determining a first average brightness intensity of first pixels in the first square;

determining a second average brightness intensity of second pixels in an area surrounding the first square, the second pixels contiguous to the first square;

calculating a difference between the first average brightness intensity and the second average brightness intensity; and identifying the first square as including the captured dot based on the difference exceeding a threshold.

3. The computer-implemented method of claim 1, wherein determining the first coordinates comprises:

determining a coordinate of the brightness center;

identifying a first section of the captured image, the first section including the brightness center;

determining a first brightness intensity for the first section;

identifying a second section of the captured image, the second section including the brightness center and being offset from the first section in a first direction;

determining a second brightness intensity for the second section;

identifying a third section of the captured image, the third section including the brightness center and being offset from the first section in a second direction opposite the first direction;

determining a third brightness intensity for the third section; and determining a coordinate of the captured dot based on the coordinate of the brightness center, the first brightness intensity, the second brightness intensity and the third brightness intensity.

4. The computer-implemented method of claim 1, wherein the calculating further comprises:

calculating the correlation scores between the captured patch and each of the plurality of reference patches using a correlation formula, the correlation formula generating respective correlation scores between the captured patch and each of the plurality of reference patches based on a respective brightness intensity of the captured patch and each of the plurality of reference patches; and determining that at least one of the correlation scores exceeds a threshold.

5. A computer-implemented method, the method comprising:

determining a first region of a first image, the first image including a plurality of first forms;

identifying a brightness center in the first region, the brightness center having a highest brightness intensity in the first region;

identifying a first form of the plurality of forms based on the brightness center;

setting a brightness intensity of pixels not associated with the first form to zero in the first region;

replacing the first form in the first region with a synthesized form to generate a first patch, brightness intensities of pixels in the synthesized form having an approximately Gaussian distribution;

calculating correlation scores between the first patch and each of a plurality of second patches in a second image, the second image including a plurality of second forms, each correlation score indicating an amount of correlation between the first patch and one of the plurality of second patches;

selecting an individual second patch having a highest correlation score of the correlation scores, the individual second patch including an individual second form of the plurality of second forms; and associating the first form with the individual second form in the individual second patch.

6. The computer-implemented method of claim 5, further comprising:

determining first coordinates for the first form;

determining second coordinates for the individual second form; and calculating a depth of the first form from the device based on the first coordinates and the second coordinates.

7. The computer-implemented method of claim 5, further comprising:

determining a coordinate of the brightness center;

identifying a first section of the first image, the first section including the brightness center;

determining a first brightness intensity for the first section;

identifying a second section of the first image, the second section including the brightness center and being offset from the first section in a first direction;

determining a second brightness intensity for the second section;

identifying a third section of the first image, the third section including the brightness center and being offset from the first section in a second direction opposite the first direction;

determining a third brightness intensity for the third section; and determining a coordinate of the first form based on the coordinate of the brightness center, the first brightness intensity, the second brightness intensity and the third brightness intensity.

8. The computer-implemented method of claim 5, wherein the identifying the first form comprises:

determining a plurality of shapes containing the brightness center;

determining a brightness score for each of the plurality of shapes;

selecting a first shape having a highest brightness score of the plurality of shapes;

determining a first average brightness intensity of first pixels in the first shape;

determining a second average brightness intensity of second pixels in an area surrounding the first shape, the second pixels contiguous to the first shape;

calculating a difference between the first average brightness intensity and the second average brightness intensity; and identifying the first shape as including the first form based on the difference exceeding a threshold.

9. The computer-implemented method of claim 8, wherein the replacing further comprises:
determining first coordinates for the first form;
determining a size of the first form;
generating the synthesized form based on the size of the first form, the synthesized form having brightness intensities evenly distributed in a bell shaped curve; and
inserting the synthesized form in the first region based on the first coordinates,
wherein the first region including the synthesized form is the first patch.

10. The computer-implemented method of claim 5, wherein the setting further comprises:
identifying a plurality of pixels included in the first form as first pixels;
identifying a plurality of pixels not included in the first form as second pixels; and
setting a brightness intensity of each of the second pixels to zero.

11. The computer-implemented method of claim 5, wherein the calculating further comprises:
calculating the correlation scores between the first patch and each of the plurality of second patches using a correlation formula, the correlation formula generating respective correlation scores between the first patch and each of the plurality of second patches based on a respective brightness intensity of the first patch and each of the plurality of second patches; and
determining that at least one of the correlation scores exceeds a threshold.

12. The computer-implemented method of claim 5, wherein the calculating further comprises:
calculating first correlation scores between the first patch and each of the plurality of second patches using a correlation formula, the correlation formula generating respective first correlation scores between the first patch and each of the plurality of second patches in a first search region based on a respective brightness intensity of the first patch and each of the plurality of second patches;
determining that none of the first correlation scores exceed a first threshold;
calculating second correlation scores between the first patch and each of the plurality of second patches using the correlation formula, the correlation formula generating respective second correlation scores between the first patch and each of the plurality of second patches in a second search region based on a respective brightness intensity of the first patch and each of the plurality of second patches, the second search region being larger than the first search region; and
determining that at least one of the second correlation scores exceeds a second threshold and using the second correlation scores as the correlation scores between the first patch and each of the plurality of second patches.

13. A system, comprising:
one or more processors; and
a memory including instructions operable to be executed by the one or more processors to perform a set of actions to configure the system to:
determine a first region of a first image, the first image including a plurality of first forms;
identify a brightness center in the first region, the brightness center having a highest brightness intensity in the first region;
identify a first form of the plurality of forms based on the brightness center;
set a brightness intensity of pixels not associated with the first form to zero in the first region;
replace the first form in the first region with a synthesized form to generate a first patch, brightness intensities of pixels in the synthesized form having an approximately Gaussian distribution;
calculate correlation scores between the first patch and each of a plurality of second patches in a second image, the second image including a plurality of second forms, each correlation score indicating an amount of correlation between the first patch and one of the plurality of second patches;
select an individual second patch having a highest correlation score of the correlation scores, the individual second patch including an individual second form of the plurality of second forms; and
associate the first form with the individual second form in the individual second patch.

14. The system of claim 13, wherein the instructions further configure the system to:
determine first coordinates for the first form;
determine second coordinates for the individual second form; and
calculate a depth of the first form from the device based on the first coordinates and the second coordinates.

15. The system of claim 13, wherein the instructions further configure the system to:
determine a coordinate of the brightness center;
identify a first section of the first image, the first section including the brightness center;
determine a first brightness intensity for the first section;
identify a second section of the first image, the second section including the brightness center and being offset from the first section in a first direction;
determine a second brightness intensity for the second section;
identify a third section of the first image, the third section including the brightness center and being offset from the first section in a second direction opposite the first direction;
determine a third brightness intensity for the third section; and
determine a coordinate of the first form based on the coordinate of the brightness center, the first brightness intensity, the second brightness intensity and the third brightness intensity.

16. The system of claim 13, wherein the instructions further configure the system to:
determine a plurality of shapes containing the brightness center;
determine a brightness score for each of the plurality of shapes;
select a first shape having a highest brightness score of the plurality of shapes;
determine a first average brightness intensity of first pixels in the first shape;
determine a second average brightness intensity of second pixels in an area surrounding the first shape, the second pixels contiguous to the first shape;
calculate a difference between the first average brightness intensity and the second average brightness intensity; and
identify the first shape as including the first form based on the difference exceeding a threshold.

17. The system of claim 13, wherein the instructions further configure the system to:
- determine first coordinates for the first form;
- determine a size of the first form;
- generate the synthesized form based on the size of the first form, the synthesized form having brightness intensities evenly distributed in a bell shaped curve; and
- insert the synthesized form in the first region based on the first coordinates,
- wherein the first region including the synthesized form is the first patch.

18. The system of claim 13, wherein the instructions further configure the system to:
- identify a plurality of pixels included in the first form as first pixels;
- identify a plurality of pixels not included in the first form as second pixels; and
- setting a brightness intensity of each of the second pixels to zero.

19. The system of claim 13, wherein the instructions further configure the system to:
- calculate the correlation scores between the first patch and each of the plurality of second patches using a correlation formula, the correlation formula generating respective correlation scores between the first patch and each of the plurality of second patches based on a respective brightness intensity of the first patch and each of the plurality of second patches; and
- determine that at least one of the correlation scores exceeds a threshold.

20. The system of claim 19, wherein the instructions further configure the system to:
- calculate first correlation scores between the first patch and each of the plurality of second patches using a correlation formula, the correlation formula generating respective first correlation scores between the first patch and each of the plurality of second patches in a first search region based on a respective brightness intensity of the first patch and each of the plurality of second patches;
- determine that none of the first correlation scores exceed a first threshold;
- calculate second correlation scores between the first patch and each of the plurality of second patches using the correlation formula, the correlation formula generating respective second correlation scores between the first patch and each of the plurality of second patches in a second search region based on a respective brightness intensity of the first patch and each of the plurality of second patches, the second search region being larger than the first search region; and
- determine that at least one of the second correlation scores exceeds a second threshold and use the second correlation scores as the correlation scores between the first patch and each of the plurality of second patches.

* * * * *